(12) United States Patent
Osborne

(10) Patent No.: US 11,675,572 B2
(45) Date of Patent: Jun. 13, 2023

(54) SHARING DATA STRUCTURES

(71) Applicant: Graphcore Limited, Bristol (GB)

(72) Inventor: Richard Luke Southwell Osborne, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 147 days.

(21) Appl. No.: 17/375,406

(22) Filed: Jul. 14, 2021

(65) Prior Publication Data

US 2022/0019415 A1 Jan. 20, 2022

(30) Foreign Application Priority Data

Jul. 14, 2020 (GB) ...................................... 2010838

(51) Int. Cl.
*G06F 9/44* (2018.01)
*G06F 8/41* (2018.01)
*G06F 16/901* (2019.01)

(52) U.S. Cl.
CPC ............ *G06F 8/41* (2013.01); *G06F 16/9024* (2019.01)

(58) Field of Classification Search
CPC ................................ G06F 8/41; G06F 16/9024
USPC .................................................. 717/149, 164
See application file for complete search history.

(56) References Cited

U.S. PATENT DOCUMENTS

| 6,665,671 | B2 * | 12/2003 | Coutant | ............... G06F 9/44521 |
| 7,430,139 | B2 * | 9/2008 | Chen | ..................... G11C 7/1039 |
| | | | | 365/63 |
| 9,009,726 | B2 * | 4/2015 | Burckhardt | ............. G06F 9/544 |
| | | | | 718/107 |
| 2009/0307430 | A1 * | 12/2009 | Bruening | ............ G06F 12/0862 |
| | | | | 711/119 |

(Continued)

FOREIGN PATENT DOCUMENTS

| GB | 2579412 A | 6/2020 |
| WO | 2020007648 A1 | 1/2020 |

OTHER PUBLICATIONS

Sohoo et al., "Cache Miss Characterization and Data Locality Optimization for Imperfectly Nested Loops on Shared Memory Multiprocessors", 2005, IEEE, 10 pages. (Year: 2005).*

(Continued)

*Primary Examiner* — Ted T. Vo
(74) *Attorney, Agent, or Firm* — Haynes and Boone, LLP

(57) ABSTRACT

In a computer comprising multiple processing units, a method of exchanging read only elements between the processing units is described. The read only elements may be code or data, such as vector or matrix data for an AI graph. A master processing unit is identified. At compile time, at least one shareable read only element is allocated to the master processing unit. The at least one shareable read only element is stored in the local memory of the master processing unit. At compile time a transmitting exchange code sequence designated to be executed at the execution stage of the master processing unit is also allocated to the (Continued)

master processing unit. At a time point determined at compile time, the transmitting exchange code sequence causes the processing unit to identify the shareable read only element and to generate a message to be transmitted for reception by another processing unit, the message comprising the shareable read only data element.

18 Claims, 16 Drawing Sheets

(56) References Cited

U.S. PATENT DOCUMENTS

2010/0262801 A1* 10/2010 Duffy ..................... G06F 9/52
711/E12.001
2020/0012482 A1    1/2020 Torudbakken

OTHER PUBLICATIONS

Basaran et al., "Grex: An efficient MapReduce framework for graphics processing units", 2013, Elsevier, pp. 522-533. (Year: 2013).*
Okamoto et al., "Thorough Evaluation of GPU Shared Memory Load and Store Instructions", 2014, IEEE, pp. 614-616. (Year: 2014).*
Torbjorn Sorman, "Comparison of Technologies for General-Purpose Computing on Graphics Processing Units", 2016, Thesis, Linkoping University, Sweden, 67 pages. (Year: 2016).*
International Search Report and Written Opinion dated Oct. 26, 2021 for Application No. PCT/EP2021/069524.

* cited by examiner

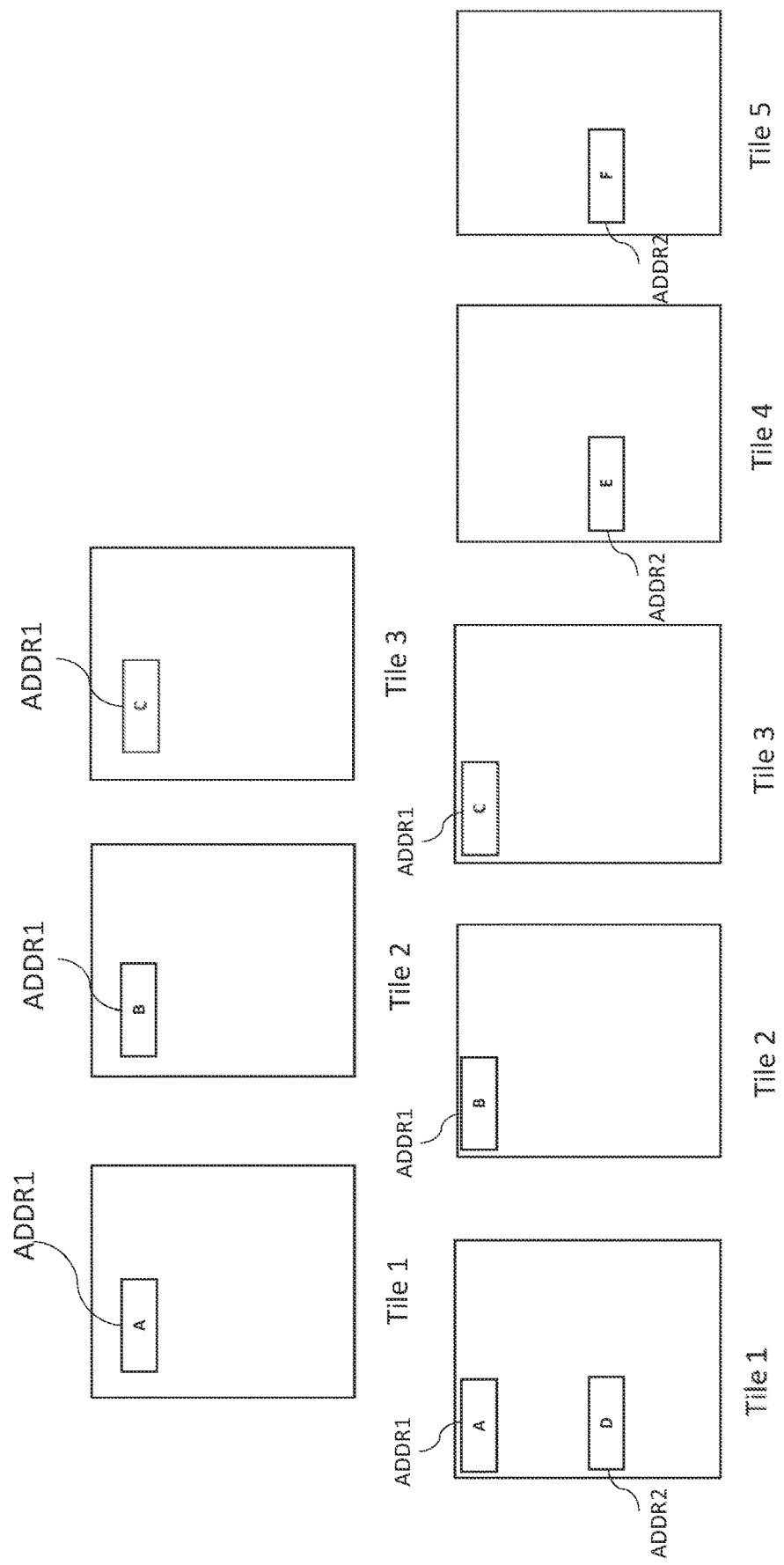

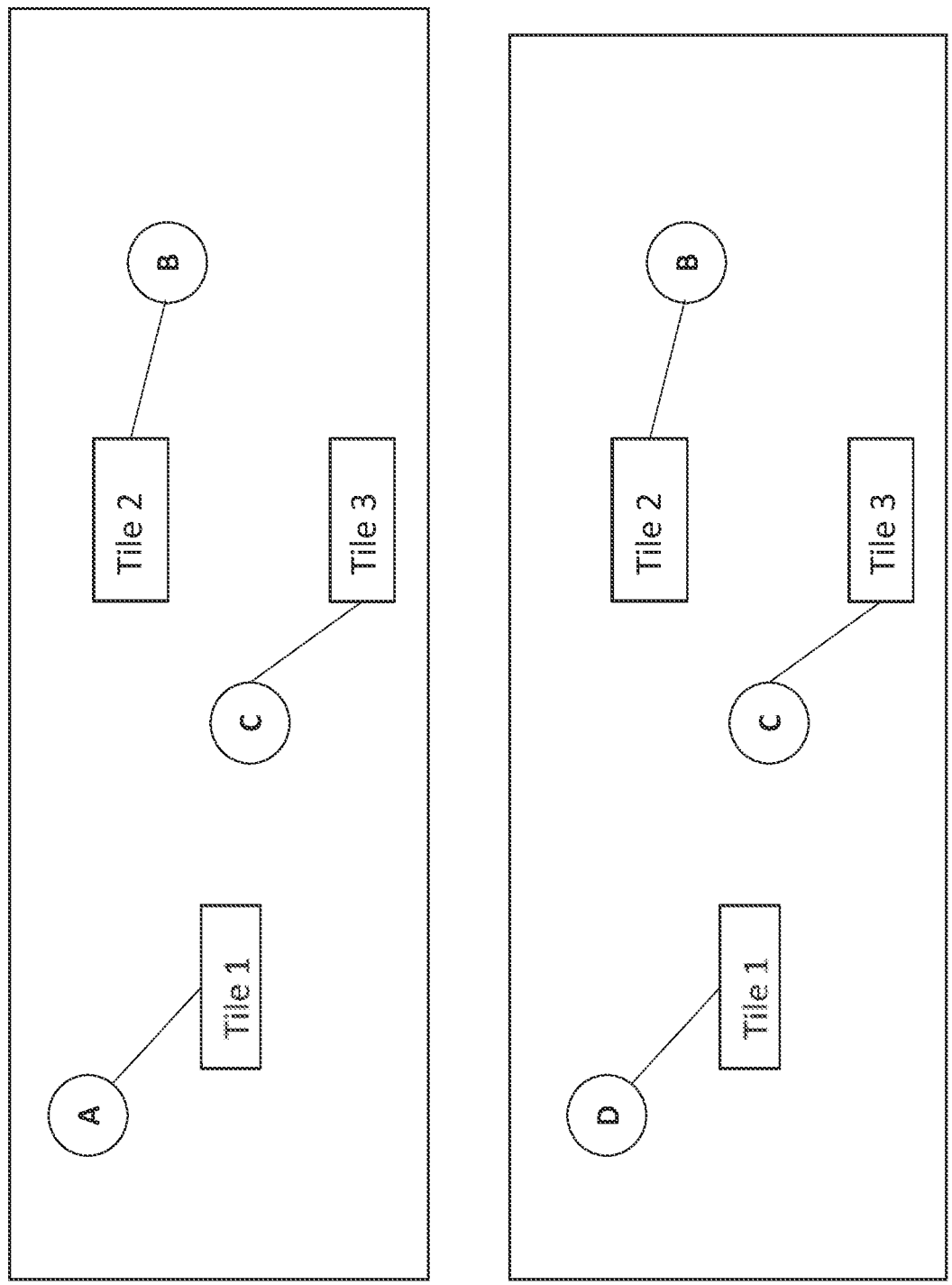

Tile 4a

Do Exchange (CS1)
Do Exchange (CS2)
Do Exchange (Vector state)
Do Exchange (CS1)
Do Exchange (CS2)
Do Exchange (Vector state)

Tile 4c

Do Exchange
Execute CS 1
Execute CS 2
Copy $Src_1$ Dest
Do Exchange
Execute CS 1
Execute CS 2
Copy $Src_1$ Dest

Figure 14

SHARING DATA STRUCTURES

CROSS-REFERENCE TO RELATED APPLICATIONS

The present application claims priority to United Kingdom Patent Application No. GB2010838.7, filed Jul. 14, 2020, the disclosure of which is hereby incorporated herein by reference in its entirety.

TECHNICAL FIELD

The present disclosure relates to compiling a graph-based program to run on a processing system comprising one or more processor chips, each comprising one or more processor modules or "tiles". The disclosure further relates to a processing system onto which compiled code has been loaded.

BACKGROUND

Programs are typically written in a high level programming language, meaning a language which is abstracted from at least some of the specific architecture of the processor, and which is therefore more understandable to a human than the low-level machine code instructions executed by the target processor. Compilation refers to the process of taking a program written in a high-level language and lowering it to a form that can be executed by a processor, i.e. converting the high-level program into a low-level program comprising machine code instructions that can be executed by a processor. "Instruction" for the purpose of the present disclosure means a machine code instruction, i.e. an instance of one of the fundamental set of instruction types which the processor's execution unit is configured to recognize and execute. This set is referred to in the art as the instruction set of the processor. Each instruction type in the instruction set is defined by a different respective opcode mapping to a corresponding type of operation in the execution unit, and by zero or more operand fields for taking a respective zero or more operands of the operation.

Nowadays the high-level program often takes the form of a graph. For instance, this can be the case where the processor comprises a plurality of processor modules, sometimes also called "tiles". Each tile comprises its own memory and execution unit (typically each configured with the same instruction set). The tiles are connected together via an on-chip interconnect which enables the pieces of code run on the different tiles to communicate with one another between tiles on the same chip (i.e. die). In some cases, the system could also comprise multiple chips, each comprising multiple tiles. In this case the chips may be connected together via an external interconnect enabling tiles on different chips to communicate with one another. The graph describes a plurality of data nodes, compute vertices, and edges between nodes and/or vertices. It is the task of the compiler, amongst other things, to determine which data nodes and which vertices are to be implemented on which tiles. Thus, separate portions of program code can be run in parallel on different ones of the tiles. Hence it is possible to connect together multiple independent processing resources with a high degree of parallelism.

An example application of parallel processing is found in machine intelligence. As will be familiar to those skilled in the art of machine intelligence, a machine intelligence algorithm is based around performing iterative updates to a "knowledge model", which can be represented by a network of multiple interconnected nodes or "neurones". Each neurone represents a function of its inputs. Some neurones receive the inputs to the network, and some receive inputs from one or more other neurotics, whilst the output of some neurones form the inputs of other neurones, and the output of some neurones provide the output of the network. Further, the function at each neurone is parameterized by one or more respective parameters, sometimes called weights (not necessarily implying multiplicative weights, though that is one possibility). During a learning stage the aim is, based on a set of experiential input data, to find values for the various weights such that the network as a whole will generate a desired output for a range of possible inputs. Various algorithms for doing this are known in the art, such as a back propagation algorithm based on stochastic gradient descent. Over multiple iterations based on the input data, the weights are gradually tuned to decrease their errors, and thus the network converges toward a solution. In a subsequent stage, the learned model can then be used to make predictions of outputs given a specified set of inputs, or to make inferences as to inputs (causes) given a specified set of outputs.

The implementation of each neurone involves the processing of data, and the interconnections of the graph correspond to data to be exchanged between the neurones. Typically, at least some of the processing of each neurone can be carried out independently of some or all others of the neurones in the network, and therefore large neural networks expose great opportunities for parallelism.

A graph-based approach is by no means limited to multi-tile processors or parallel processing, nor to neural networks or machine intelligence applications. In general, a graph may be used to describe any complex flow or interrelationship between computations and data.

To maximise the usefulness of parallel processing, it is desirable for as many tasks to be carried out in parallel as a particular chip will allow. That is, ideally all tiles are simultaneously active (executing code) for a substantial portion of the time. In order for a tile to be active, an execution unit of a tile is executing instructions which form part of a local program stored in local memory of the tile. Some types of graph (particularly machine learning and neural network graphs) require the same operation to be carried out in multiple tiles simultaneously. In order to achieve this, the same local program needs to be available on each tile. This may be accomplished by lowering the compiled version of the program onto each tile when the chip is configured to implement the graph.

SUMMARY

The present inventors have recognised that this places capacity demand on the local memories of each tile within the chip. Once a local program has been permanently stored in binary (machine readable) form on a tile, it uses up that memory space whether or not it is currently being executed by the tile. Such permanent storage is sometimes referred to as 'baking' into the binary.

The inventors have further recognised that similar considerations apply to data which may be provided to the local programs. That data may include constants which are required by the program, and which would therefore need to be duplicated across all tiles which had a particular program requiring the constants.

The present disclosure addresses these and other challenges.

An aspect of the present disclosure provides a method of storing code on a computer comprising multiple processing units, each processing unit having a local memory configured to store read only elements including executable code sequences and an execution stage for executing at least some of the executable code sequences stored in the local memory, the method comprising:

identifying at least one of the multiple processing units of the computer as a master processing unit;

compiling read only elements including executable code sequences for loading into the processing units of the computer, the compiling including allocating at least one shareable read only element to the master processing unit;

storing in the local memory of the master processing unit the at least one shareable read only element, which is designated to be used by an execution stage of at least one other of the processing units, and a transmitting exchange code sequence designated to be executed at the execution stage of the master processing unit at a time point determined at compile time, the transmitting exchange code sequence causing the processing unit to identify the shareable read only element and to generate a message to be transmitted for reception by the at least one other processing unit, the message comprising the shareable read only data element.

The shareable read only element may comprise an executable code sequence to be executed at the execution stage of the at least one other processing unit.

For example, the executable code sequence may comprise an instance of a vertex in an application graph.

In another example, the executable code sequence may comprise control code for managing execution of code sequences in the processing units of the computer.

In another example, the shareable read only element comprises a constant value which may be one of:

vertex state, vertex descriptor, and field data.

In some embodiments, the compiling comprises allocating at least one non-shareable read only element to at least one of the multiple processing units.

In some embodiments, the at least one shareable read only element is contained within a shared data structure which comprises multiple shareable read only elements.

The step of allocating the at least one shareable read only element may comprise allocating multiple shareable read only elements to respective addresses in respective ones of the processing units and resolving address constraints of the shareable read only elements.

In some embodiments, the method comprises storing in the local memory of the at least one other processing unit a receiving exchange code sequence designated to be executed at the execution stage of the at least one other processing unit, the receiving exchange code sequence causing the at least one other processing unit to store the shareable read only element received in the message at an allocated address in the local memory of the at least one other processing unit.

In some embodiments, the step of allocating at least one shareable read only element to the master processing unit comprises:

identifying at least one shared data structure comprising multiple shareable read only element in a program flow to be compiled, comparing the storage requirement in memory of the shared data structure with the storage requirement in memory of the transmitting exchange code sequence, and determining, based on the comparison, whether to allocate the read only element as a shareable data structure to the master processing unit or whether to replicate the data structure over multiple processing units.

The program flow may represent an application graph.

Another aspect of the disclosure provides a computer comprising:

multiple processing units, each processing unit having a local memory configured to store read only elements including executable code sequences, and an execution stage for executing at least some of the executable code sequences stored in the local memory, wherein at least one of the multiple processing units comprises a master processing unit, the local memory of which is configured to store at least one shareable read only element which is designated to be used by an execution stage of at least one other of the processing units, and a transmitting exchange code sequence designated to be executed at the execution stage of the master processing unit and which causes the master processing unit to identify the shareable read only element and to generate a message to be transmitted for reception by at least one other of the processing units, wherein the at least one other processing unit has stored in its local memory a receiving exchange code sequence which causes the at least one other of the processing units to receive the shareable read only element from the message and to store it at an address in its local memory for a usage period only, the at least one other processing unit being configured to delete the shareable read only element from its local memory after the usage period. There is no need to have a delete policy for removing the shareable read only elements from the local memory. In some embodiments it may be overwritten as determined at compile time when a new value is written in. At compile time the point in the program where it is no longer needed is noted, which means it can be overwritten later. It may not be overwritten immediately and indeed it may not be overwritten at all—it may depend on whether the compiler finds another variable that is written later that can be allocated to an overlapping address.

The message generated by the transmitting exchange code may comprise a load address at which the shareable data read only element is to be stored at the at least one other processing unit. The load address may be in the message or in the exchange code. In some embodiments, the address to write the data that is received is specified in the receiving exchange code.

The at least one shareable read only element stored in the memory of the master processing unit may form part of a shared data structure comprising multiple shareable read only elements.

In some embodiments, the computer comprises multiple master processing units.

The shared data structure may comprise an executable code sequence or a set of constant values.

In some embodiments, the step of allocating at least one shareable read only element to the master processing unit comprises:

identifying at least one shared data structure comprising multiple shareable read only element in a program flow to be compiled, comparing the storage requirement in memory of the shared data structure with the storage requirement in memory of the transmitting exchange code sequence, and determining, based on the comparison, whether to allocate the read only element as a shareable data structure to the master processing unit or whether to replicate the data structure over multiple processing units.

The program flow may represent an application graph.

BRIEF DESCRIPTION OF THE DRAWINGS

To assist understanding of embodiments of the present disclosure and to show how such embodiments may be put into effect, reference is made, by way of example only, to the accompanying drawings:

FIG. 4 illustrates a set of tiles storing variables to be equal address constrained, FIGS. 4A and 4B show different sets of variables, FIG. 14 illustrates an example of a program on each of two tiles.

DETAILED DESCRIPTION OF EMBODIMENTS

In the following described embodiments of the present invention, a computer, and a method of compiling for a computer are described in which memory usage may be optimised by identifying read only elements which can be shared amongst processing units of the computer. The term "shared structure" or "shared data structure" is used herein to refer to read only elements which may be shared. If multiple processing units require the same read only elements, one option is to include the appropriate shared data structure in each program compiled for each processing unit, such that there is a duplication on the computer. According to embodiments of the invention, an alternative technique is provided in which the shared data structure is stored in a master processing unit, and transmitted to one or more other processing units when it is needed. There is a trade-off between the amount of memory needed for storage of the shared data structure and storage of exchange code needed to share the data structure between processing units, as well as the communications and time overhead involved when the programs are running. If a shared data structure is relatively small (in terms of the memory resource that it used up), it may be more appropriate to duplicate this across multiple processing units in the compiled programs, rather than to use the sharing technique of the described embodiments.

In one aspect described herein, an analysis is carried out indicating whether to use the sharing scheme, or whether to duplicate the data structure across multiple processing units.

The read only elements may be code or constant variables.

Figure 1:
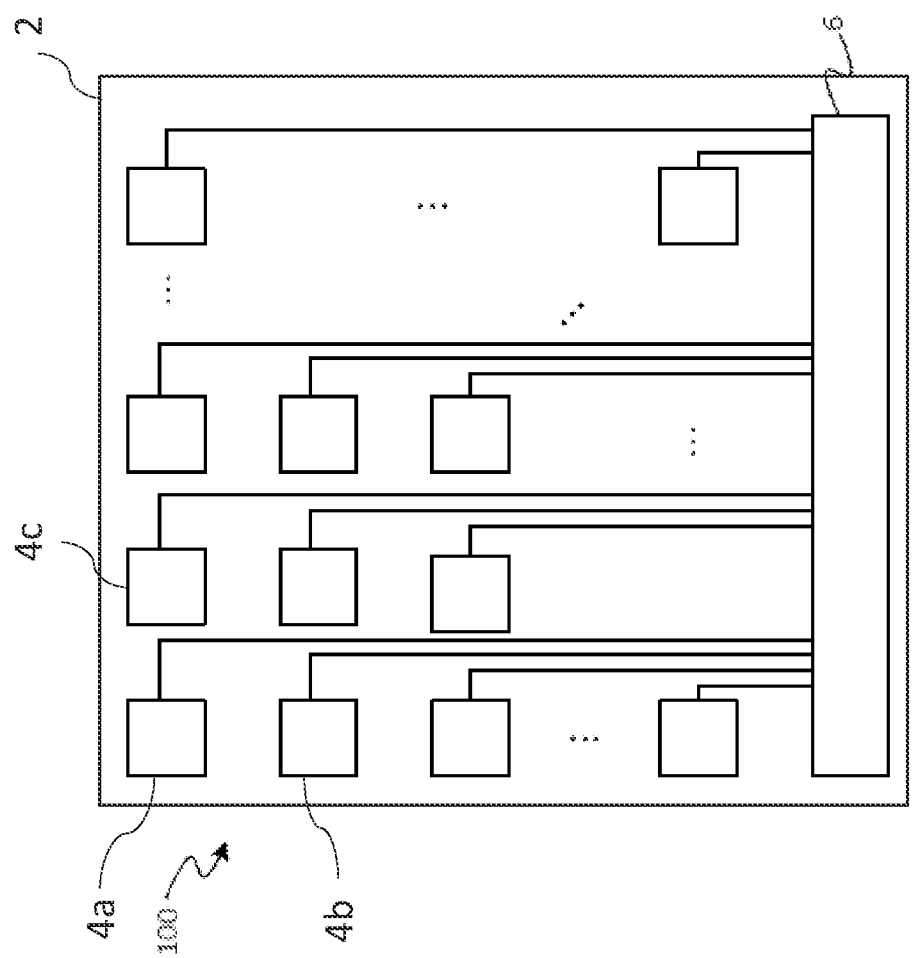
FIG. 1 is a schematic block diagram of a system comprising multiple tiles.
Figure 2:
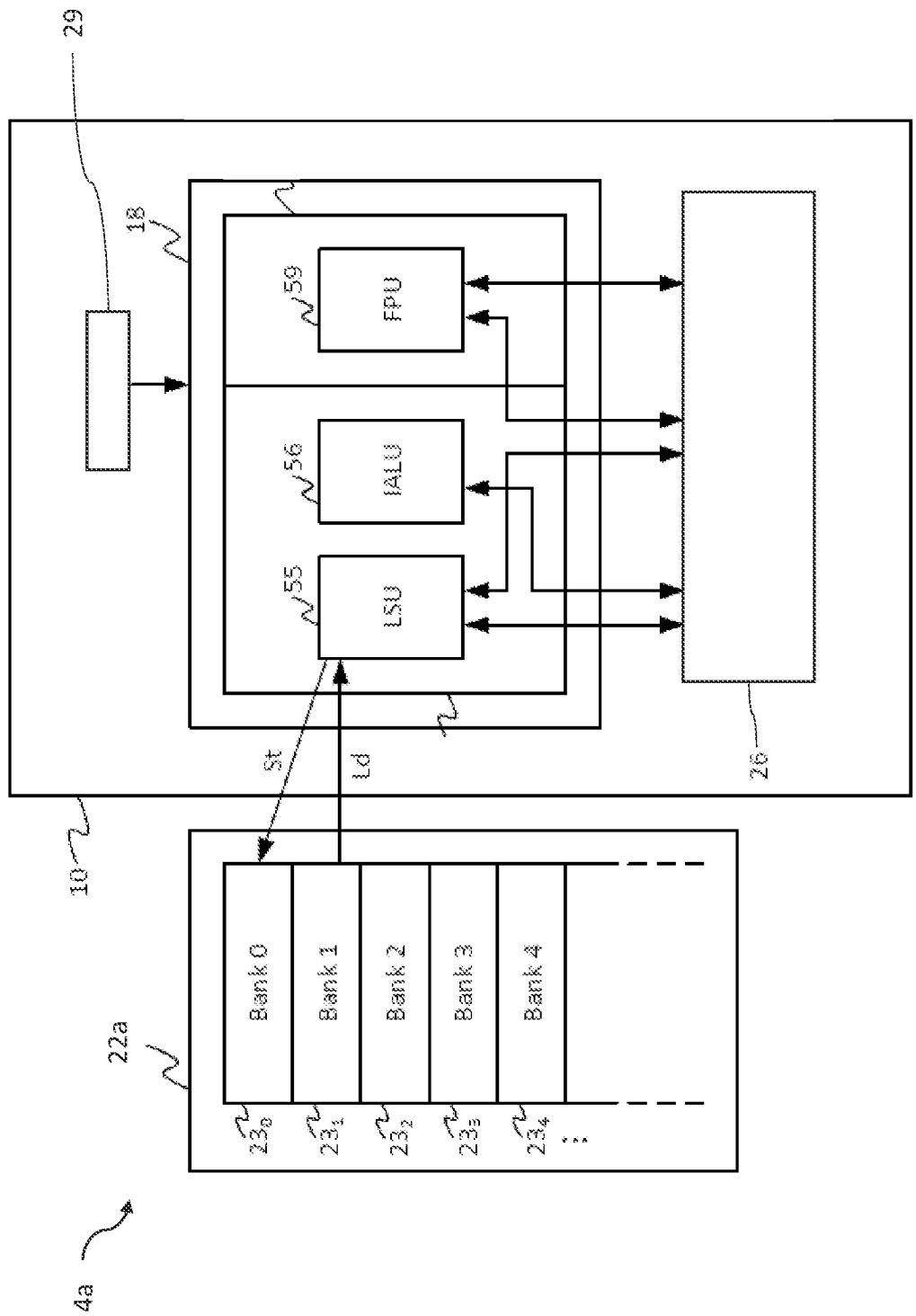
FIG. 2 is a schematic block diagram of a processor module.

FIG. 1 shows an example processing system in the form of a computer 100 upon which a compiled program may be executed in accordance with embodiments disclosed herein. The computer comprises a plurality of processor modules 4a, 4b, 4c etc called tiles. The tiles 4a, 4b, 4c may be implemented on one or more processor chips 2, with multiple tiles 4 on each chip (i.e. die). Referring to FIG. 2, each individual tile e.g. tile 4a, comprises its own respective processing unit 10, each processing unit comprising its own respective execution unit 18 for executing machine code instructions. Each individual tile also comprises its own respective memory 22a for storing data and code. Thus, the computer 100 supports a great deal of parallelism, enabling parallel execution of different respective parts of the overall program on different ones of the tiles 4a, 4b, 4c etc. For instance, the chip 2 could comprise ≥10, ≥20, ≥50, ≥100, ≥200, ≥500 or even ≥1000 tiles. E.g. in example implementations there may be 1216 or 1280 tiles per chip. Furthermore, in embodiments each processing unit may take the form of a multi-threaded processing unit for interleaving multiple concurrent threads through the same pipeline. However, this is not essential for the present purposes.

The computer 100 also comprises an interconnect 6 comprising hardware logic which forms part of an exchange mechanism enabling the different tiles 4a, 4b, 4c etc. to communicate with one another in order to exchange data, e.g. so that the results of computations performed by one tile e.g. tile 4a, can be sent to another, e.g. tile 4c. The interconnect 6 comprises at least an internal (on-chip) interconnect on the chip 2, for communicating between tiles 4a on the same chip 2. In accordance with embodiments of the present invention, the interconnect 6 also enables shared data structures to be exchanged between tile memories.

As part of the compilation process, different parts of the program are allocated to run on different ones of the tiles 4, and to exchange data with one another in order to operate together to implement the overall program as a whole. For instance the program may comprise a machine learning algorithm comprising a neural network, and different tiles may run parts of the program representing different vertices of the neural network. The different parts of the program, when compiled, are configured to synchronize with one another according to a suitable synchronization scheme such as bulk synchronous parallel (BSP), rendezvous, or the post box approach. Preferably a BSP scheme is used.

According to BSP, each tile performs a compute phase and an exchange phase in an alternating manner. During the compute phase each tile performs one or more computation tasks locally on tile, but does not communicate any results of its computations with any others of the tiles. In the exchange phase each tile is allowed to exchange one or more results of the computations from the preceding compute phase to and/or from one or more others of the tiles in the group, but does not yet begin a new compute phase until that tile has finished its exchange phase. Further, according to this form of BSP principle, a barrier synchronization is placed at the juncture transitioning from the compute phase into the exchange phase, or transitioning from the exchange phases into the compute phase, or both. That is it say, either: (a) all tiles are required to complete their respective compute phases before any in the group is allowed to proceed to the next exchange phase, or (b) all tiles in the group are required to complete their respective exchange phases before any tile in the group is allowed to proceed to the next compute phase, or (c) both. When used herein the phrase "between a compute phase and an exchange phase" encompasses all these options.

When data is exchanged according to BSP, each tile indicates its synchronisation state to a sync module. Once it has been established that each tile is ready to send data, the synchronisation process causes the system to enter an exchange phase. In this exchange phase, data values move between tiles (in fact between the memories of tiles in a memory-to-memory data movement). In the exchange phase, there are no computations which might induce concurrency hazards between tile programs.

Exchange of data or code between tiles can be by any suitable exchange mechanism. One such mechanism developed by Graphcore is described in our patent application PWF REF 408525EP, US-20190121387-A1 the contents of which are herein incorporated by reference. In the exchange phase, each shared element moves along connection wires which provide an exit from a tile to a certain exchange path. At each clock cycle, the shared element moves a certain distance along its path (for example from latch to latch, in a pipelined fashion. When the shared element is issued from a tile, it is not issued with a header identifying a recipient tile. Instead, the recipient tile knows that it will be expecting an element from a certain transmitting tile at a certain time. To receive the element at that certain time, the exchange recipient tile controls a switch to connect the input of the recipient tile to the exchange path of the transmitting tile. This is referred to as "time deterministic". Each tile operates a program which has been allocated to it by the programmer or by a compiler exercise, where the programmer or the compiler function has knowledge of what will be transmitted by a particular tile at a certain time and what needs to be received by a recipient tile at a certain time. In order to achieve this, SEND instructions are included in the local programs executed by the processor on each tile, where the time of execution of the SEND instruction is predetermined relative to the timing of other instructions being executed on other tiles in the computer.

In order to implement time determinism, a compiler compiles programs for the tiles based on the time it takes for an element to travel between the transmitting end recipient tiles (the inter-tile delays). The function of a compiler to compile a graph is now described. The compiler receives a graph of interconnected nodes and links. Nodes and links may also be referred to as vertices and edges. The compiler compiles the functions in the graphs into a multiplicity of codelets, which are contained into local programs. Each local program is designed to be loaded into a particular tile of the computer. Each program comprises one or more codelets, plus a supervisor sub-program each formed of a sequence of instructions. In certain embodiments, the compiler generates the programs such that they are linked to each other in time; that is, they are time deterministic. In order to do this, the compiler accesses tile data which includes tile identifiers which are indicative of the physical relative locations of the tiles and therefore the inter-tile delays which the compiler needs to understand in order to generate the local programs in a time deterministic way. The delays can be computed based on the tile data. Alternatively, the tile data can incorporate a data structure in which these delays are available through a lookup table.

It will be appreciated that the arrangement of FIG. 1 is given only by way of example. More generally, the system 100 may comprise multiple processor modules (processing units) 4 on the same chip 2 or spread across multiple chips 2 with one or more processor modules 4 per chip 2. It would be possible in principle to apply the techniques described herein in a situation where there are multiple processor modules on the same chip, or where processor modules are spread across multiple chips. However, it is expected that there would be greater benefit in using the techniques described herein when sharing data structures between multiple tiles on chip, particularly in a context where there is a large number of tiles per chip (such as 1216 or 1280 as in one of the embodiments described herein). After sharing data structures between a large number of tiles in a single chip, there has already been a significant reduction in the amount of memory used for shared data structures such that memory reduction from sharing between chips may be negligible relative to the total memory used. Moreover, when sharing between chips, the fact that there is less aggregate bandwidth between chips than on a chip, needs to be taken into account when considering runtime cost.

Figure 5:
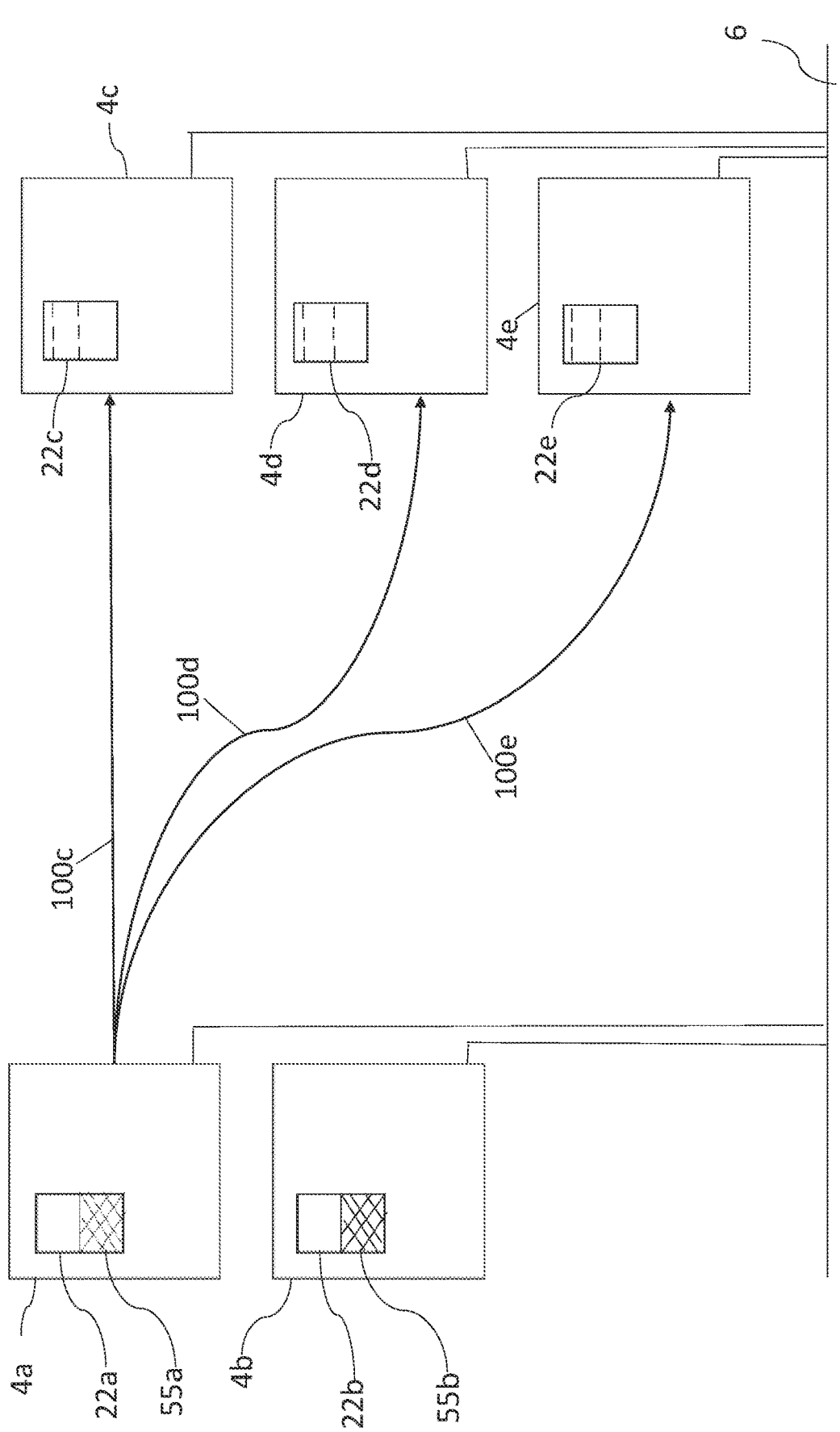
FIG. 5 illustrates the exchange of data between different tiles.

The present disclosure relates to compiling code for a multi-tile chip of the type illustrated for example in FIG. 1. In order to maximise the benefits of parallelism, many tiles may be executing the same set of vertices (compute set) on the same vertex state at the same time. This requires that the necessary code and data be available on these tiles. This, however, is duplicative of memory usage, and can restrict the size of the models which may be executed on the chip. To overcome this, the present disclosure enables the sharing of certain structures between tiles at runtime. FIG. 5 illustrates the core principles discussed herein. These principles pertain to a method for sharing certain chunks of constant data that is ordinarily always live between multiple tiles. Such chunks may be referred to herein as 'shared structures'. The intended benefits of doing this are set out below. In this context, the ordinarily always live data can be either executable code or data elements consumed by executable code, such as constant variables. The ordinarily always live data is read only data. Such data may, for example, be vertex state data. Vertex state may contain (i) pointers to data (which pointers are read only) and/or (ii) data (which may or may not be read only). As described more fully in the following, for each vertex state structure a check is carried out to see if it only contains pointers and data which is read only. If so, it is a candidate to be shared. Vertex state structures which contain data which can change are not suitable to be shared according to the techniques described herein.

One benefit is the ability to share data which was previously constant and always live between multiple tiles, so that it is only live at the point when it is needed on tiles. In the case that available memory on a tile is scarce, that tile may be selected to receive shared data structures as and when they are required, as opposed to constantly storing them at all times. This frees up memory capacity on those tiles where memory is scarce. The shared data structures may be moved to other tiles with more free space to allocate. Such tiles may become master or storage tiles for transmitting shared structures to other tiles.

Another benefit of the techniques described herein is the ability to reduce replication of data across tiles by storing a single copy of the shared data and broadcasting it out when it is needed to those tiles, which need the same data.

It should be noted that the system described herein has particular advantages when used for multi-cast exchange of data, wherein shared data structures are sent from a master tile to multiple recipient tiles during the same exchange phase of a synchronised group of tiles. That is, sharing read-only data elements when they are needed, rather than storing duplicates on each tile, becomes more beneficial as the number of tiles receiving data increases.

Note also that when multiple read only data elements are shared during an exchange phase, one or more of the read only data elements may be provided for use in the compute phase that immediately follows the exchange phase in which they were shared. However, one or more of the read only data elements may be provided for use in a compute phase that does not immediately follow the exchange phase in which they were shared. For example, a line of code may be shared between the master tile and one or more recipient tile in an exchange phase. In some cases, the code may define a program that is to be run in a compute phase that does not immediately follow the exchange phase in which the code was received at the one or more recipient tile. Note that the less exchange-compute cycles in advance a read only data element is shared, the more significant the storage benefit.

In summary, the present techniques enable a trade-off to be made between processing cycles required on a tile to exchange data between tiles, and the memory capacity required for storing always live data with an aim to reducing the burden on memory resources on tiles where that is most needed.

FIG. 5 illustrates the principles discussed herein. FIG. 5 illustrates some tiles 4a, 4b, 4c, 4d, 4e of the chip 2 as shown in FIG. 1. According to one feature described herein, a number of tiles in the chip's tile array are allocated to be used as storage tiles for always live data (shared structures) that is required for use across multiple tiles. For example, in FIG. 5, tiles 4a and 4b are allocated as storage tiles. They may be referred to herein as master tiles. It is to be understood that the term master tile does not imply any particular hierarchical or control function, but only that these tiles are storage tiles for always live data that may be used in other tiles in the system 2. Each master tile has a memory. In FIG. 5, tile 4a is shown having memory 22a and tile 4b is shown having memory 22b. Each memory comprises different portions or regions which will be discussed later. Certain portions of the memory may be allocated for storing always live data 55a, 55b, which may be shared with other tiles in the chip 2. Certain other portions or regions of memory may be allocated to be used only in operation when the local tile (for example, 4a or 4b respectively) is carrying out its processing functions. That is, the memory 22a, 22b on each tile may hold a mix of always-live data which might be shared with other tiles, and always-live data which might be used only on that tile. There is also a certain amount of address space in the memory allocated for the writing and reading of variables which have been processed by the local tile. The always-live data which is available to be exchanged may be copied over to other tiles via the exchange mechanism implemented on the chip 2, instead of being permanently stored in the binary code for each tile. For example, arrow 100c denotes a situation where a portion of data 55a from memory 22a is supplied to another tile 4c via the chip's exchange mechanism. Similarly, arrow 100d denotes the sharing of that same portion of data 55a with an alternate tile 4d, and arrow 100e illustrates the sharing of that portion of data 55a with a further alternate tile 4e. The arrows are diagrammatic only—in practical embodiments sharing is via the interconnect 6. Note that portions of data 55b from the memory 22b may be similarly exchanged. Note also that different portions of the memory 22a may be shared with different tiles (it may not always be the same portion which is broadcast to the tiles 4c, 4d, 4e etc). It is further noted that although only five tiles are shown in FIG. 5, in practice, the array may have many tiles, as discussed with reference to FIG. 1, with a small number of tiles being allocated as master (storage) tiles, and another set of tiles being allocated to receive always-live data as and when needed. In this context, a small number of tiles is considered to be two or three, but could be any number provided that it is not the complete set of tiles in the array on any particular chip. Generally, it would not be useful unless a number less than one third of the total number of tiles on the chip were designated as storage tiles, and the remaining tiles designated as recipient tiles.

By not requiring the totality of always live data to be available in each tile of the chip that may require those items, the amount of memory that is being used for storing the always-live data at any one point in a program's execution may be reduced. This allows larger models to fit onto a chip, without increasing the number of tiles or memory capacity required for the models.

The exchange mechanism uses an exchange code sequence comprising a set of instructions, which is provided in the local program within each tile 4. This exchange code sequence is to be executed by the execution unit 18 of the tile, each time data is to be exchanged with another tile on the chip. Data to be shared could be the outputs (results) of local processing, and/or shared structures as described herein. Exchange of data between tiles is via the interconnect 6.

The address in memory where received data is stored is determined at compile time as described herein. Note that the exchange sequence has code for transmitting data from the storage tile to a recipient tile. Exchange code on the recipient tile is used to enable the data to be received. Note that the location of the exchange code within the local program is also the responsibility of the compiler at compile time. When the code, which is compiled and stored on the chip, is for performing a model in the form of a graph as discussed herein, always-live data may comprise one or more of the following:

host and global exchange packet headers;
stack;
vertex instances;
copy descriptors;
vector list descriptors;
vertex field data;
control code;
vertex code;
internal and host exchange code.

Each of these may have different memory storage requirements, for example require a differing number of bytes.

In the following, the present techniques are described in the context of sharing the categories of vertex code, vertex state and control code. It will readily be appreciated that the techniques described herein may also be applied to other types of always live data in memory.

As described in more detail herein, vertex code is the code generated for codelets added to a graph and used by vertices added to compute sets. One copy of the vertex code is required for each of the vertices instantiated on each tile.

Vertex state defines the members of vertex class instantiations on each tile.

The control code comprises code generated to run all the vertices in a compute set, handle control flow and carry out other control functions within a control program which forms part of the local program on each tile. As previously described, the term "shared structures" is used herein to denote always live data items which are exchanged between tiles. That is, a shared structure may be transmitted from one of the master (storage) tiles to one or more recipient tiles at the time it is needed by the recipient tile. The time at which a shared structure is required by recipient tile is determined at compile time. Note that this is not an absolute time, but it is a time relative to other aspects of a program which is being run on a recipient tile. The compiler understands the run sequence of programs across all of the tiles, and can therefore schedule exchange of the shared structure at an appropriate time.

When the compiler is compiling a program tree for a particular model, it may introduce shared structure exchange code sequences at points within the program tree. Such shared structure exchange code sequences enable shared structures to be exchanged at that point in the program. A liveness analysis of the program tree may be carried out before modifying it and attempting to insert a new shared structure exchange code sequence at points where it is determined that storing the relevant shared structure on each tile would increase the overall maximum live memory. That is, it is determined that an overall reduction in the maximum live memory of the overall program (across all tiles) may be achieved by comparing the size of the shared structure with the size of the exchange code sequence used to transmit it and receive it. Note here that "size" denotes the number of bytes required to store the shared structure in memory.

The amount of data that is common across tiles may be increased (i.e. by increasing the size of shared structures) by using what is termed herein "equal address constraints".

Figure 3:
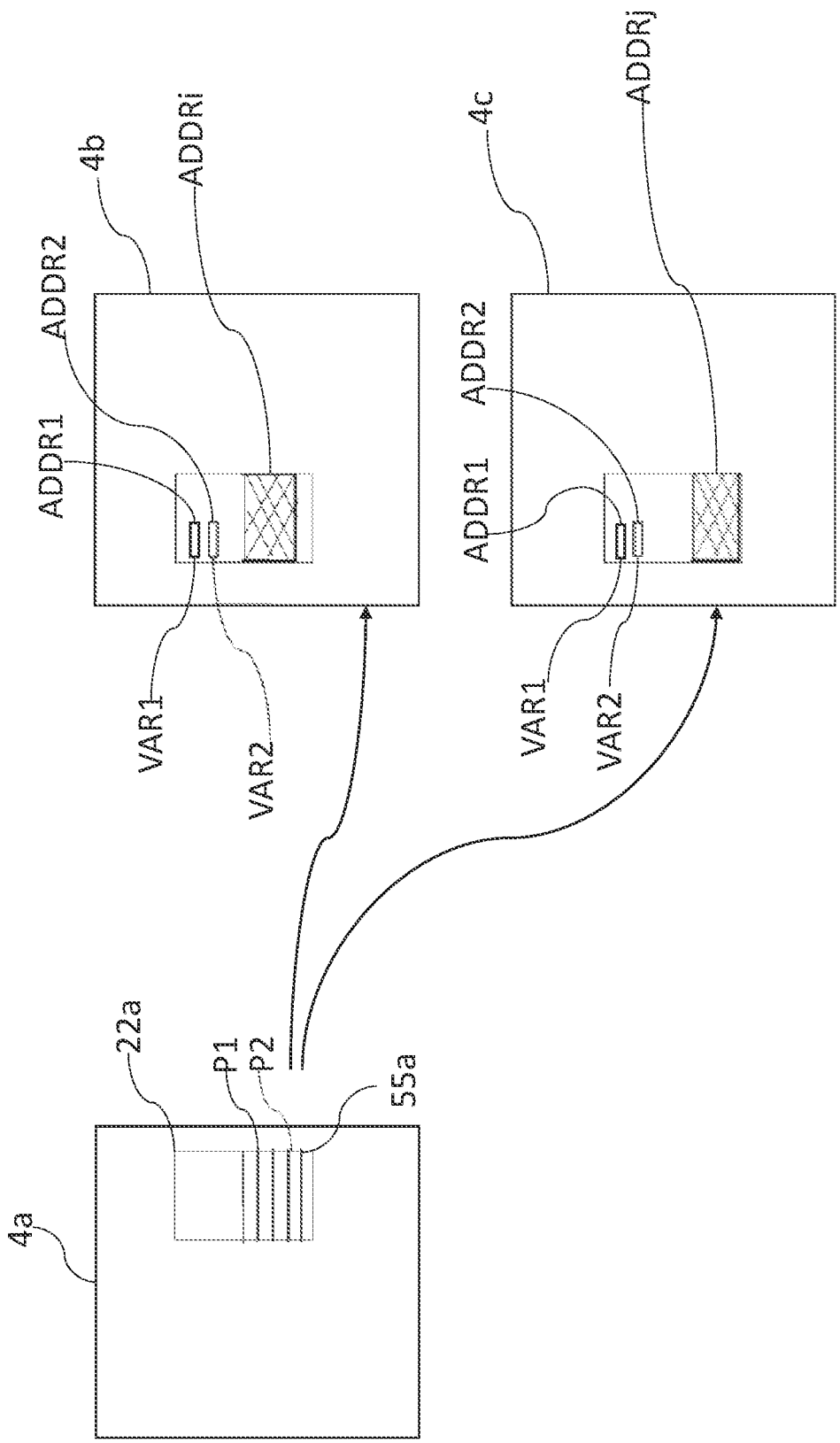
FIG. 3 illustrates a tile storing a code sequence having pointers addressing different variables.

FIG. 3 illustrates read only data, such as a code sequence, which comprises first and second pointers P1, P2 for example. It will be appreciated that two pointers is an example—there could be one or more pointers. Each pointer might be four bytes long. It will be understood that pointers may be of any type or any length. Different formats of pointers are discussed later. The read only data may be shared structure 55a installed in a portion of the memory 22a on the master tile 4a. When the code is to be used at a set of recipient tiles, an exchange code sequence is executed by an execution unit on tile 4a to transmit the shared structure 55a to (as illustrated in this case by way of example) recipient tiles 4b and 4c. The code may be received and installed at ADDRi in tile 4b. The code may be installed at ADDRj in tile 4c.

Note that it is not necessary for the incoming read only data, such as a code portion, to be stored at the same address in each of the recipient tiles, provided that the local program, which has been compiled for each of the recipient tiles understands where to locate the code to execute it. However, when the code contains one or more pointer, as in the present example, these pointers may address variables to be used by the code. FIG. 3 shows four separate variables (VAR1, VAR2, VAR3, VAR4) where VAR1 and VAR2 are on tile 4b and VAR3 and VAR4 are on tile 4c. The variables are not in the shared stricture, but are pointed to from the structure. The variables need not have the same value or size.

Applying an equal address constraint on the variables VAR1 and VAR3 ensures they are allocated at the same address. Thus if VAR1 is stored at ADDR1 in tile 4b then VAR3 is also stored at ADDR1 in tile 4c. The same pointer or painters in the shared structure may be used to refer to both. Correspondingly VAR2 and VAR4 may be address constrained and pointed to.

For example, pointer P1 may address variable VAR1 and pointer P2 may address variable VAR2. More complex pointer formats are discussed later. If an equal address constraint is applied, the variable VAR1 is stored at a certain address in tile 4b, and VAR3 is constrained to be held at the same address in tile 4c. For example, ADDR1 may be used for storing VAR1/VAR3 in both tiles. Note that all tiles have a common addressing policy. Similarly, the variable VAR2 may be stored at ADDR2 in tile 4b, and VAR4 at ADDR2 in tile 4c. Thus, whether the code portion is running on tile 4b or tile 4c, the pointer P1 always points to variables VAR1/VAR3 at ADDR1 and the pointer P2 always points to variable VAR2/VAR4 at ADDR2.

For example, a sequence of instructions in a piece of vertex code may in principle be used on all of the tiles within the chip that are responsible for executing vertex code. Vertex state or control code may be shared, using pointers to access data (variables).

In the case of sharing vertex state, the variables would represent the data the vertex operates on (i.e. the variables it is connected to via an edge the graph). In the case of sharing control code then the variable could represent vertex state (the run instruction that might appear as shared control code points to the vertex state).

Different shared structures may be used for code and for data because other constraints on memory layout may in some cases mean it is not always possible to store them together. It is possible for the control code to be shared as well as the vertex state it refers to—in this case the pointer in the shared control code will point to an address inside the vertex state shared structure and the vertex state shared structure will be equal address constrained.

A variable can be equal address constrained as long as the variable has not already been equal address constrained with any other variable whose tile intersects with the set of tiles for the set of variables to be constrained.

Figure 4A:
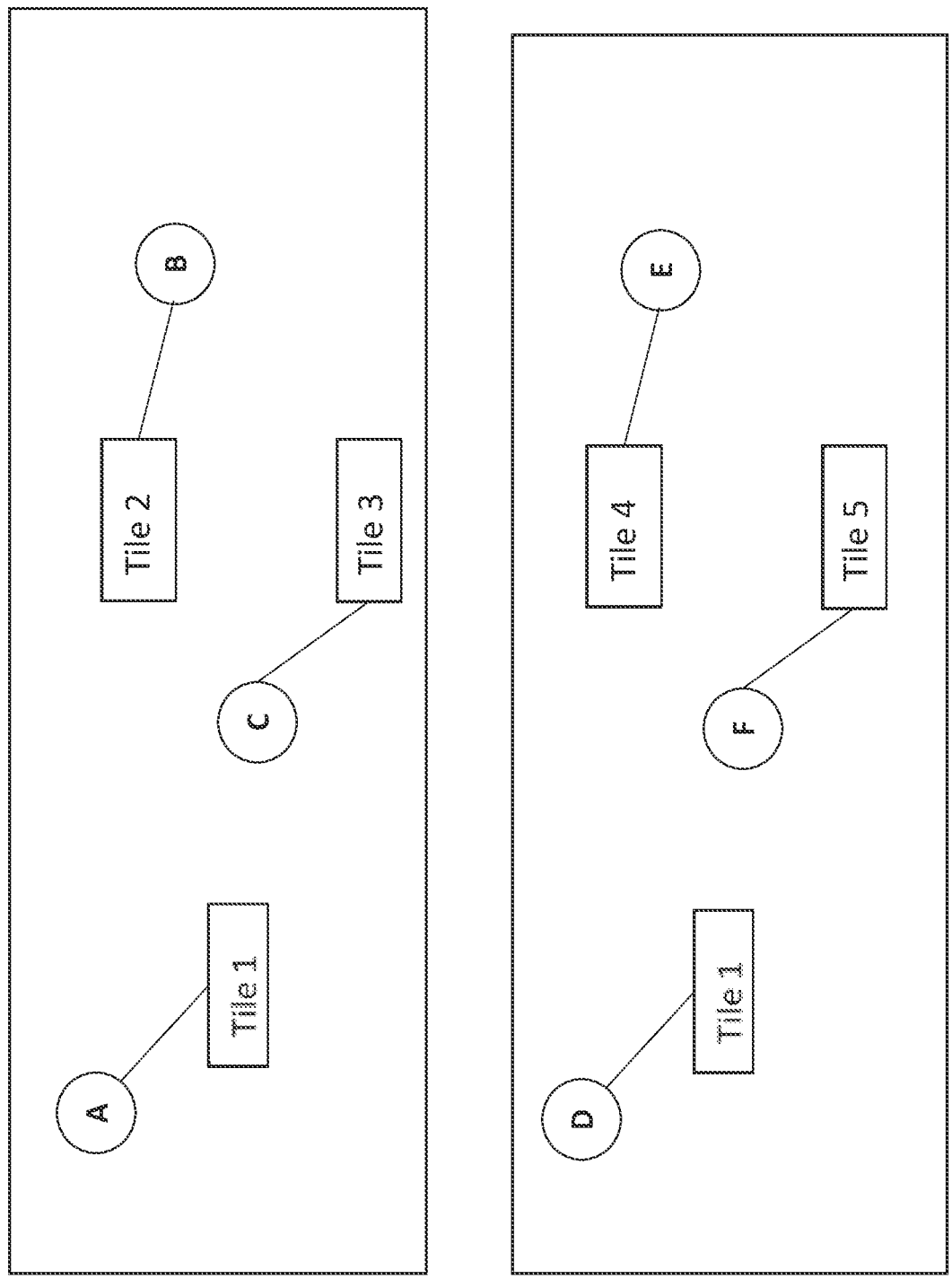

For example, see FIG. 4. In FIG. 4A, a first set of tiles is shown as tile 1, tile 2 and tile 3. Variable A is on tile 1, variable B is on tile 2 and variable C is on tile 3. Variables A, B and C denote the set of variables to be equal address constrained. If variables If A, B and C are in the same equal address set then the address of each variable on each respective tile is constrained to be the same. This is shown on ADDR1 in FIG. 4.

Consider now an additional set of variables D, E and F to be stored on tiles 1, 4 and 5 (see FIG. 4A). Similar constraints apply. In this case, it is possible for these two equal address sets to exist, as only variables A and D are on the same tile such that they can be allocated at different addresses while variable B and C, and E and F are constrained to the same address as their tile 1 representative (shown dotted in tile 1).

FIG. 4 shows the two sets of variables in which the position in the address space of a tile memory is illustrated by the location of the relevant rectangle. Variables A, B and C are address constrained. Thus, in set 1, variable A is at ADDR1 on tile 1, variable B is at ADDR1 on tile 2 and variable C is at ADDR1 on tile 3. In the second set variables D, E and F are constrained to be allocated at the same address ADDR2. As A and D are on the same tile—Tile 1—they cannot be allocated at the same address and so the address of A, B and C must be different from D, E and F.

However, consider an alternate case in FIG. 4B, where a first variable set is A on tile 1, B on tile 2 and C on tile 3, and the second variable set is D on tile 1, B on tile 2 and C on tile 3. Note that in FIG. 4B, it is not possible to equal address constrain these two sets, because variables B and C need to be at the same address, which would have the effect that variables A and D would also need to be at the same address. However, as variable A and D both sit at tile 1, this would cause a clash.

Note that prior to allocation, addresses ADDR1 and 2 are not predetermined address locations. However, they will turn into predetermined address locations after the compiler has finished allocating addresses to the entirety of the code. In the meantime, they are marked as address constrained.

There are several formats of pointers inside vertex state that can be constrained. If the can be constrained, vertex state may form part of a shared structure.

The vertex state structure is stored in memory. It may contain a pointer. In that case, at some offset inside the vertex state structure the value of that memory location will be the address of the block of memory that the pointer points to.

Figure 6:
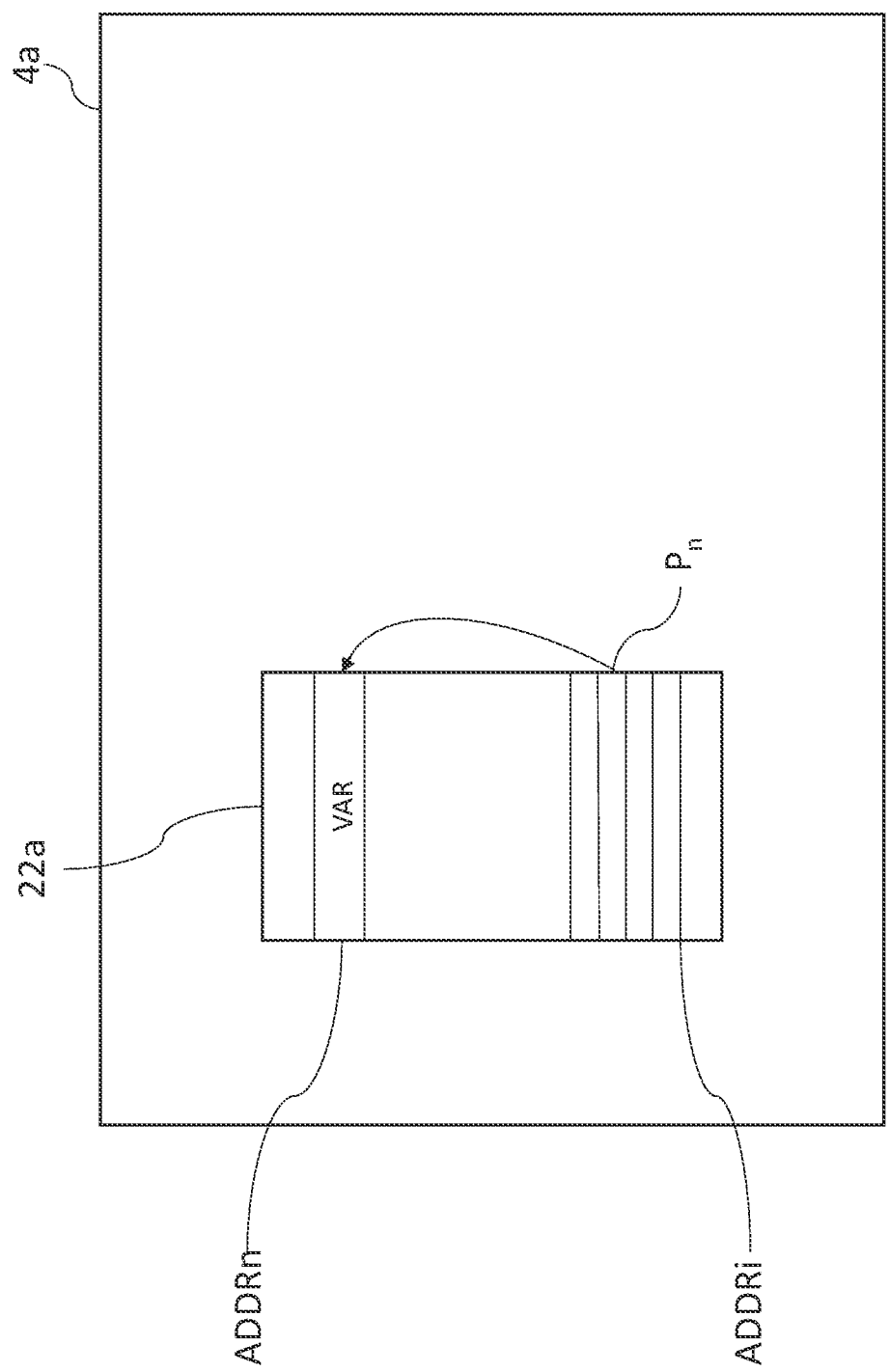
FIG. 6 illustrates a set of tiles storing a pointer to a register holding an address.

The simplest form of pointer format is a one-dimensional vector. These simply point to a contiguous block of memory. To share them, this block of memory must be equal address constrained. See, for example FIG. 6 where a pointer Pn points to a location ADDRn of a memory block forming part of the memory 22*a*. ADDRn holds the variable VAR.

Figure 7:
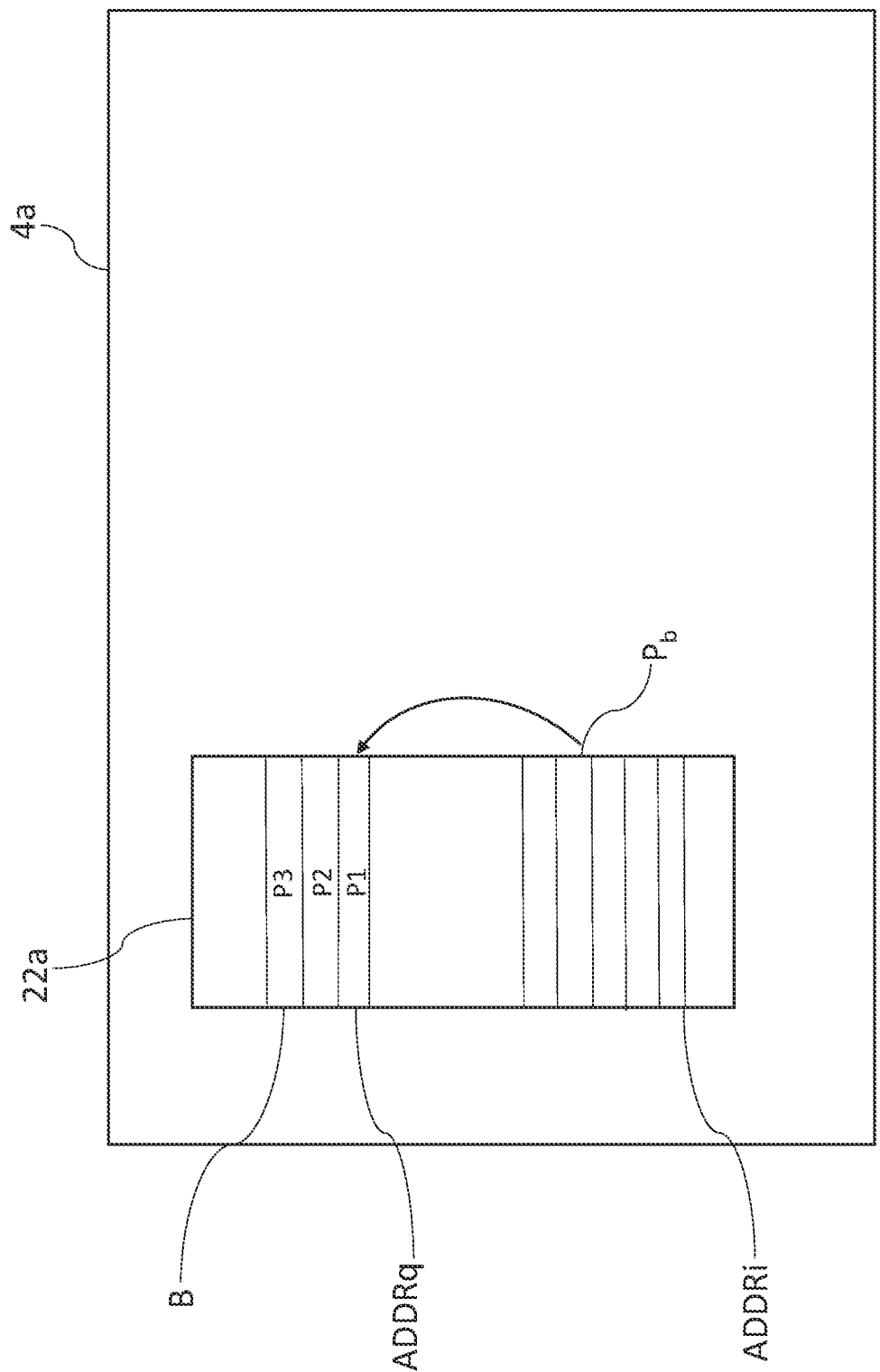
FIG. 7 illustrates a tile storing a pointer comprising a two-dimensional vector.

Another format of pointer is a two-dimensional vector which contains an extra level of direction. A base pointer Pb points to a contiguous block B of other pointers P1, P2 etc. See FIG. 7 where Pb identifies memory location at address ADDRq, which identifies the base of block B. For example, vertex field data mentioned above may comprise a block of pointers. To share this, the contiguous block of pointers need to be address constrained. Note that vertex code may be shared and/or vertex state may be shared. The choice of whether to share vertex state is independent of whether to share vertex code.

Figure 8:
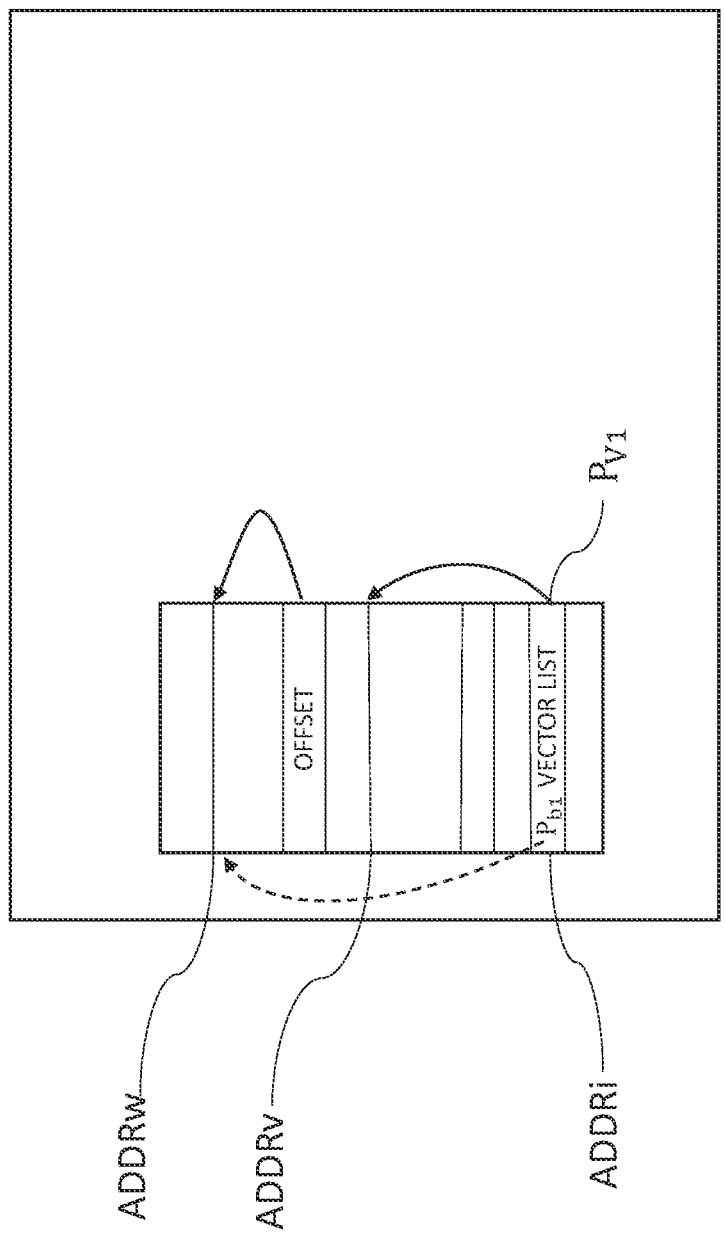
FIG. 8 illustrates a tile storing a pointer comprising a vector list, FIG. 9 schematically illustrates a method of compiling a program, FIG. 10 schematically illustrates a portion of an input graph, FIG. 11 schematically illustrates a vertex of a graph with input and output edges, FIG. 12 schematically illustrates two equivalent graph representations.

Another form of pointer is a data structure, for example a vector list, which contains an extra level of direction (like the two-dimensional vector mentioned above), but wherein the extra level is also a contiguous block of memory—see FIG. 8. That is, the memory block ADDRv to which the first pointer $P_{v1}$ points (via register 26) is an indirect layer which contains offsets into a second level of memory ADDRw represented by a base pointer $P_{b1}$. The location of the outer memory location is baked into the vertex state itself which means that this layer must also be constrained or the internal state that is shared will not be the same. A vector list has two pointers stored in the vertex state. One is the pointer $P_{r1}$ to a block of memory containing offsets and the other is the base pointer $P_{B1}$ that the offsets are added to in order to form the address of the variables the vector list refers to. In order to share vertex state that contains a vector list the addresses of the blocks of memory containing offsets need to be equal address constrained, and where the memory location that the base pointer points to must also be equally address constrained.

If it is not possible to create a shared structure representing a piece of vertex state in which the set of variables is constrained, the compiler will attempt to address constrain a smaller subset of those variables in an effort to constrain the vertex state into two identical pieces. This may provide a shared structure which contains vertex state for a local tile program more than once.

Vertex code may also be compiled into a shared structure. Unlike vertex state, where each one is unique to a single indication of a vertex in a compute set, vertex code is reused across the lifetime of the program. Vertex code may be formed into a shared structure in the following ways.

In one way, all vertex code is stored on a single master (storage tile) and a shared structure is built up dynamically that contains the vertex code needed during the lifetime of the shared structure.

According to another way, the shared structures are built at compile time, duplicating any vertex code that is used in more than one compute set The second way simpler than the first way, although it does use more memory across the chip. However, it has been found that the extra memory use of duplicating vertex code does not have a significant impact relative to the simplicity. Each vertex has a type that defines the inputs and outputs it has and the code to execute when the vertex is run. Each instance of a particular type is sometimes referred to as a codelet. Multiple vertices can have the same codelet. Each vertex has a separate vertex state structure, but the same code is used for all vertices that share the same codelet.

Consider the scenarios where there are two compute sets, compute set A which contains vertices of type C0 and C1 and compute set B which contains vertices of type C0 and C2. A shared structure copy may be inserted before each compute set, including C0 and C1 in the shared structure copy before compute set A and C0 and C2 in the shared structure copy before compute set B. In this case, two shared structures are created on the master tile, one containing C0 and C1 and one containing C0 and C2, i.e. C0 is duplicated and stored twice on the master tile. The benefit of duplicating C0 is that all the vertex code required for each shared structure copy is in one contiguous block and so it is straightforward to copy.

In this way, code can be shared so everything the code refers to via pointers is either also shared itself or is equal address constrained.

Control code comprises different program types, having supervisor code depending on the function to be implemented. For each different type of control code program, each different permutation of supervisor code is placed inside the shared structure, and the control program on each tile branches to the correct offset using a call instruction and branches back to the control program once at the end of the shared program.

In some applications, each program may comprise only a small amount of assembly code. For example, control code needed to run the vertices in a compute might be as small as four instructions, although this is just an example and other numbers of instructions may be used. In such cases, greater benefit is gained by sharing the programs with consecutive programs collapsed together. This can be achieved by obtaining the union of all tiles between two shared programs.

FIG. 14 shows examples of a logical flow which may be implemented on each of two tiles. Tile 4*a* is the master tile in this context, and tile 4*c* is one of several recipient tiles. Tile 4*c* is responsible for executing compute sets, for example each compute set may be a set of vertices. The same vertices may be run on different vertex state. These compute sets can be precompiled onto individual tiles or can themselves be shared from a master tile. Control code for controlling the execution of the vertices and/or vertex state on which the compute sets are run may be shared. According to the shared structure paradigm herein, it firstly needs to receive these shared structures from the master tile. The recipient tile 4*c* firstly performs a Do Exchange step which uses exchange code to receive a first shared structure, such as vertex state or control code. The compute sets CS1, CS2 are executed under control of the control code on first vertex state, and the results copied to local (on tile) memory.

Subsequently, the same tile may need to execute the same compute sets CS1, CS2 on a different data set representing second vertex state. Another Do-Exchange step is performed to receive the second shared data structure of the second vertex state. Note that shared data structures may be exchanged before each stage of execution when they are required, or there may be a look ahead function which receives the compute sets a few cycles ahead of when they are required.

The master tile 4a is illustrated as having a sequence of Do Exchange steps, each of which transmits always live data to the recipient tile 4c. For example, the shared data structures are transmitted when they are needed by recipient tiles, determined at compile time. In reality, the master tile will also be carrying out additional functions, but for the purposes of the present description its core function is that of transmitting shared structures to recipient tiles.

Note that the timing of the exchange performed in the master tile relative to the execution of the compute sets in the recipient tile is determined by the complier at compile time, and before each local program is stored into the respective tile.

As referenced above, FIG. 2 gives a schematic example of the processor module or tile e.g. tile 4a. In the case of multiple tiles, in some embodiments each tile may comprise an identical instance of the processor module 4. Note however that the stored data held in the memory 22a may differ between tiles as described herein. The processing unit 10 comprises the execution unit 18, one or more register files 26, an instruction fetch stage (not shown) and an instruction decode stage (not shown).

The memory 22a comprises a plurality of separate memory banks or regions $23_0$, $23_1$, $23_2$ etc. In embodiments, each bank 23 is 16 kB in size, but any suitable size may be implemented. As explained above, certain regions of the memory 22a are arranged to store data to be operated on by code executed by the execution unit 18, and data resulting from operations performed by the code executed by the execution unit 18. Other regions of the memory 22a are used to store the code itself. Other regions of the memory may store shared structures. The execution unit 18 is arranged to receive and execute machine code instructions 27 fetched from memory 22a by the fetch stage and decoded by the decode stage. The execution unit 18 is configured to recognize a certain instruction set defining types of instructions, each instruction type defined by a different respective opcode and comprising a corresponding zero or more operand fields. Each of the instructions 27 issued into the execution unit 18 is an instance of one of these instruction types defined by the instruction set of the execution unit 18.

These instruction types may include memory access instructions (load and store type instructions), logic instructions (integer arithmetic instructions and floating point instructions) and control instructions (for managing the local program). The execution unit 18 comprises a load-store unit (LSU) 55 for executing the instances of the memory access instructions, an integer arithmetic logic unit (IALU) 56 for executing the instances of the integer arithmetic instructions, and a floating point logic unit (FPU) 59 for executing the instances of the floating point instructions. The execution unit 18 comprises additional units (not shown) for executing instances of control instructions. The execution unit 18 comprises hardware logic configured to be triggered by the opcode of each instruction to perform the corresponding operation associated with the type of the executed instruction.

Each memory access instruction, when executed, triggers the load-store unit (LSU) 55 to perform at least one load operation or one store operation, depending on the particular type of memory access instruction. A load operation comprises loading data from a source address in the memory 22a into at least one of the registers in one of the register files 26. The source memory address and register location are specified by operands of the instruction. In embodiments, as discussed above, the source memory address is specified by means of a pointer (i.e. the operand of the instruction identifies a register in one of the register files 26 in which the source memory address is held, rather than specifying the memory address directly). A store operation comprises storing data from at least one of the register files 26 into a destination address in the memory 22a. The destination memory address and register location are specified by operands of the instruction. In embodiments, the destination memory address is specified by means of a pointer (i.e. the operand of the instruction identifies a register in one of the register files 26 in which the destination memory address is held). Different pointer formats may have different levels of direction, as discussed above.

Logic instructions such as floating point and integer arithmetic instructions trigger the floating point unit (FPU) 59 or integer logic unit (IALU) 56, respectively, to perform a type of mathematical operation mapped to the opcode. The operands of the instruction may take one or more source operands specifying a source register or registers from which to take values to be operated upon, and one or more destination operands specifying a destination register or registers into which to place the result or results of the operations performed by the instruction. For example, a simple add instruction typically takes at least three operands: two sources and a destination. When executed, it causes the execution unit 18 to take the values in the two source registers, add them, and place the resulting sum in the destination register. Similar logic applies for e.g. simple subtract, multiply and divide instructions. Various other types of logic instruction may also be included in the instruction set, e.g. vector multiplication, matrix multiplication and convolution instructions. Control instructions are executed to manage the local programs as described above.

Thus the code run on the processing module can be used to load data from memory 22a into the register files 26, perform operations on the data in the register files 26, store the results back to memory 22a, and manage the program flow.

The instructions are executed over a sequence of instruction issue cycles. In each instruction issue cycle, the fetch stage provides at least one instruction 29 to the execution unit 18 for execution. In embodiments, the execution unit 18 may be pipelined. Further, in some embodiments, the execution unit 18 may comprise a plurality of parallel pipelines.

In embodiments, the processing unit 10 may be a multi-threaded processing unit, also called a barrel-threaded processing unit. This means that the fetch stage is configured to fetch instructions from different program threads and temporally interleave them through the execution unit 18 in different time slots, typically according to a round robin or weighted round robin schedule. More generally, the execution unit 18 could comprise a single pipeline or need not even be pipelined, and the processing unit 10 could be multi-threaded or configured to execute only a single program thread.

Figure 9:
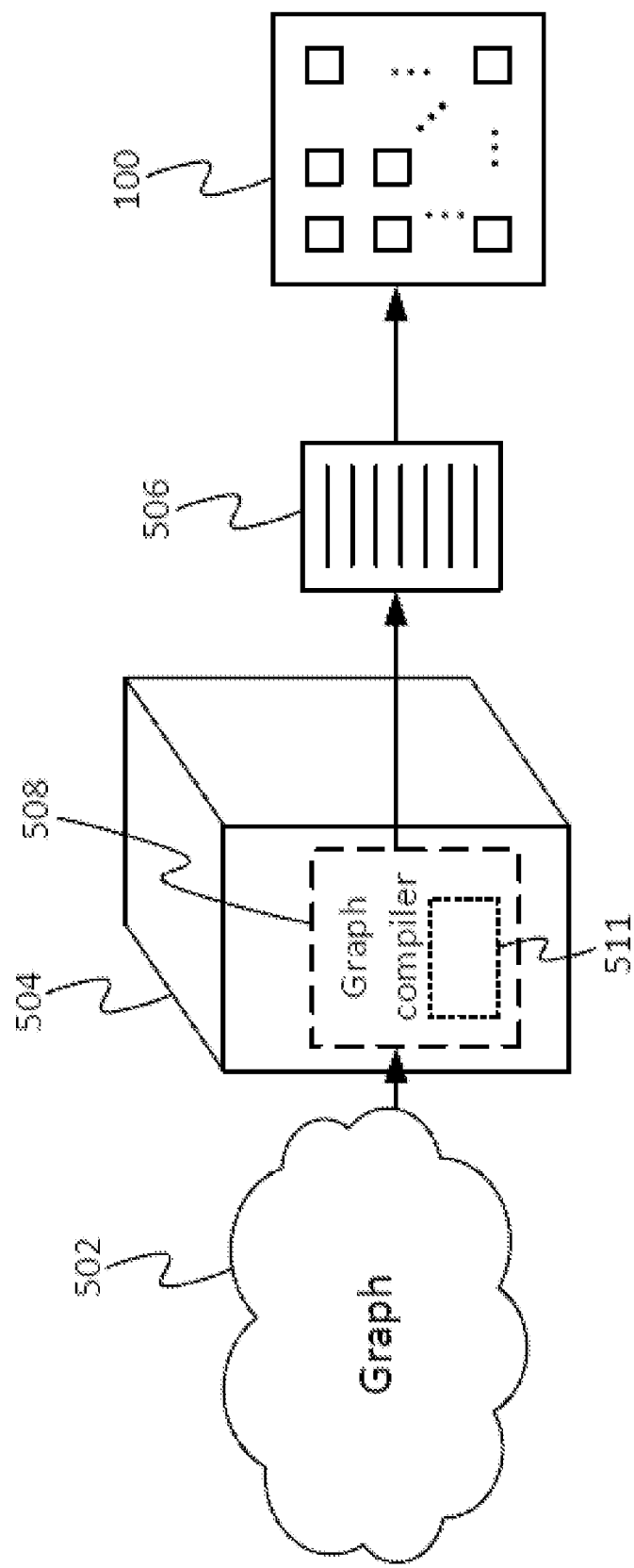

FIG. 9 illustrates an apparatus for compiling a high-level, graph-based program into a low-level machine code program in order to run on a computer system 100, such as that described in relation to FIGS. 1 and 2.

The apparatus comprises a computer 504, which could take the form of a server comprising one or more server units at one or more geographical sites, or one or more user terminals such as a desktop computer, or a combination of a server and one or more user terminals. The computer 504 is arranged to run a compiler 508, taking the form of software stored on computer-readable storage of the computer 504 (e.g. one or more internal and/or external magnetic disk drives and/or EEPROMs) and arranged to run on one or more processors of the computer 504 (e.g. one or more CPUs). The compiler 508, when run on the computer 504, is arranged to receive an input graph 502, and to compile the input graph 502 in order to generate an executable program 506 which can then be run on a multi-tile compute system 100 such as that described in relation to FIGS. 1 and 2.

Figure 10:
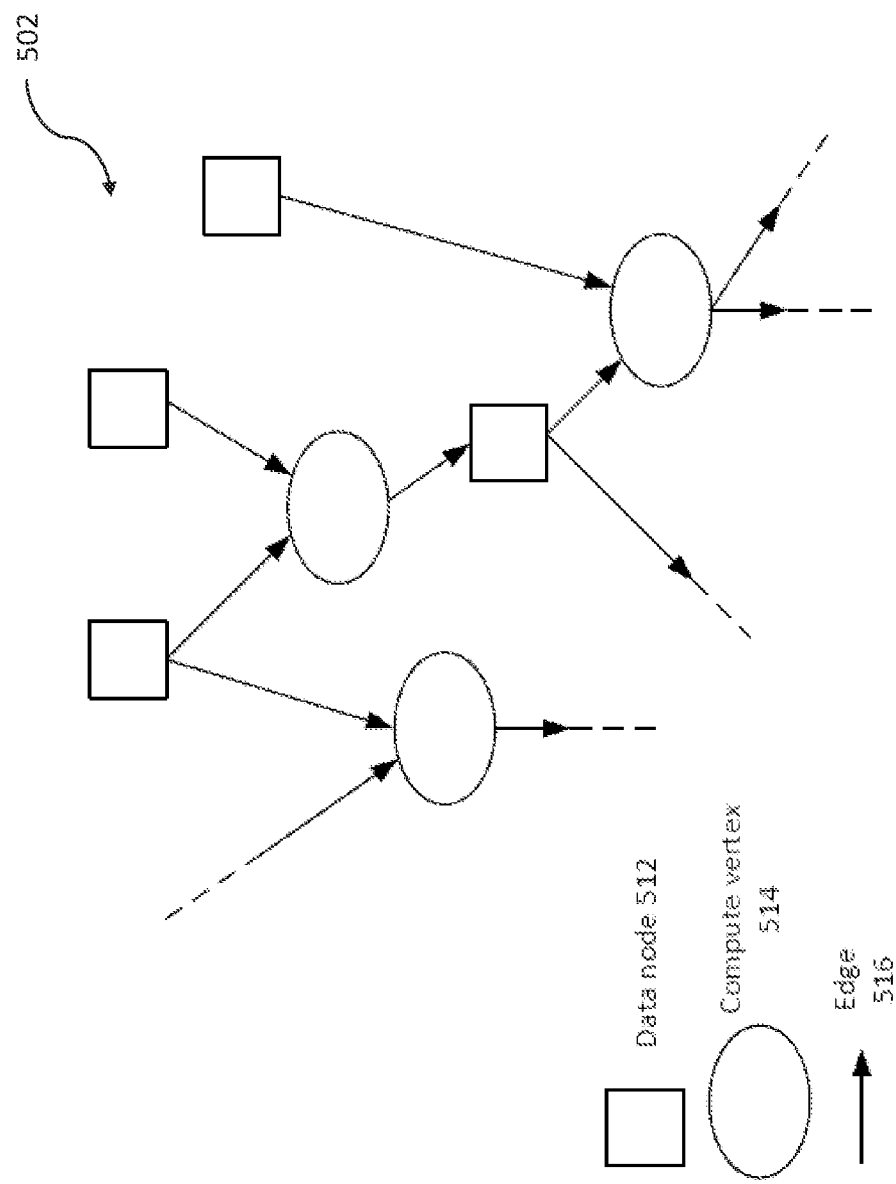

An example of an input graph is shown in FIG. 10. The input graph 502 comprises a plurality of data nodes 512, a plurality of compute vertices 514, and a plurality of directional edges 516 each connecting between a respective pair of data node and vertex.

Each data node 512 represents a data element, meaning herein a variable. Note that in the context of computing or computer science, the term "variable" does not necessarily imply that the value of the variable has to change during runtime: it could vary or remain constant (i.e. a constant may be considered a type of variable in the sense of computing). This is the sense in which the term "variable" is used herein. To avoid confusion with other contexts, the term "data element" may be also adopted. Note also that a data element or variable as referred to herein refers to a numerical data object or construct abstracted from the particular value of that object at any one moment in time. For instance the variable or data element could be a numerical object labelled Var1 in the high-level language, that could happen to take a constant value or whose value could vary one or more times during the running of the compiled program Each edge 516 represents an output from a compute vertex 514 to a data node 512 or vice versa. Each compute vertex 514 (i.e. compute node) represents one or more computations to be performed on one or more inputs received on the edge(s) output from one or more data nodes 512, the result(s) of which is/are output to one or more data nodes 512 (typically one or more other data nodes) on the output edge(s) from the respective compute vertex 514. It will be appreciated that the particular graph topology shown in FIG. 10 is just by way of example, and in practice the graph 502 will also tend to comprise many more nodes 512, edges 516 and vertices 514, in potentially more complex configurations. FIG. 10 may be considered to show an example fragment of a graph for illustrative purposes. Note also that while the input graph 502 is illustrated schematically as originating externally to the computer 504, which is one possibility, it could also originate from within the same computer 504 (e.g. having been authored and/or stored thereon using a suitable authoring tool, not shown).

The input graph 502 may be designed by a human developer to implement the data flows and computations the developer wishes (the "developer" here could be one person or a team). For instance, the graph 502 may comprise a tensor flow as part of a neural network. Note that in the case where the graph 502 implements a neural network, then each node or "neurone" of the neural network may comprise one or more compute vertices 514 and one or more data nodes 512 of the graph 502 (i.e. of the programmatic structure of the program). I.e. the topography of the neural network may be described at a higher level of abstraction than the graph 502 of the program.

Figure 11:
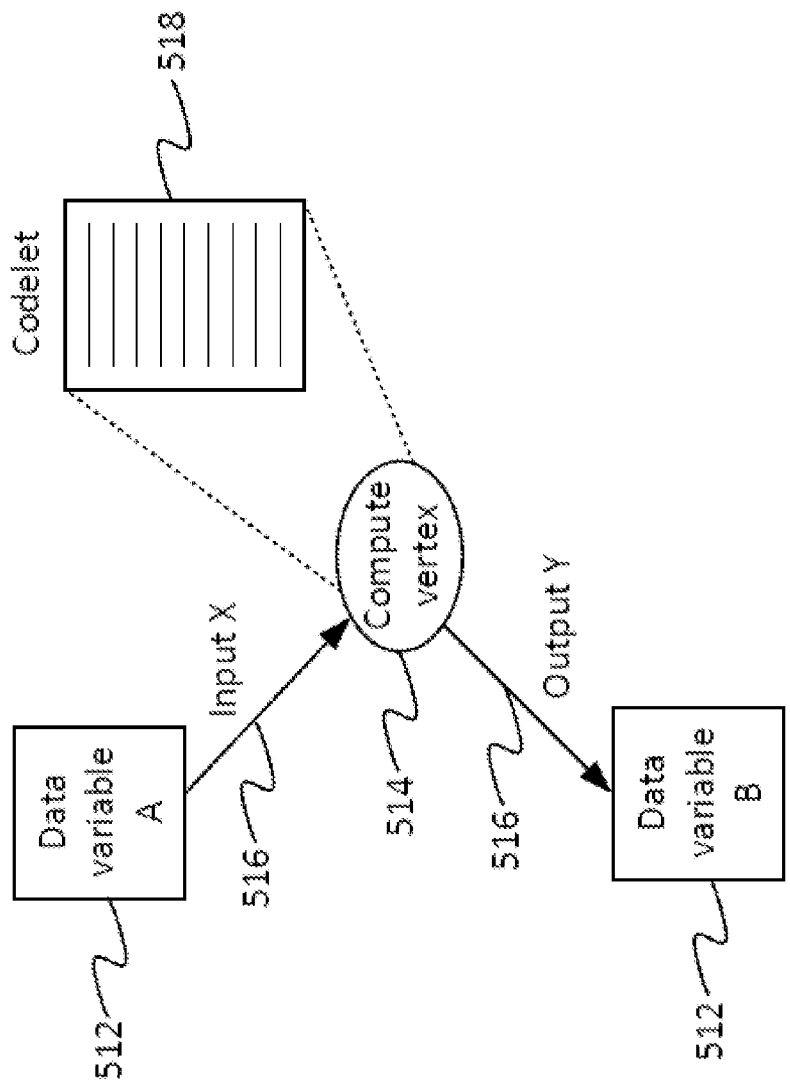

FIG. 11 illustrates an example of a particular compute vertex 514 having an input X from a data node 512 representing a first variable A, and an output Y to a second data node 512 representing a second variable B. As also illustrated, the vertex 518 may comprise one or more codelets 518. A codelet is a particular type of thread, sometimes also referred to as an "atomic" thread. It has all the input information it needs to execute from the beginning of the thread (from the time of being launched), i.e. it does not take any input from any other part of the program or from memory after being launched. Further, no other part of the program will use any outputs (results) of the thread until it has terminated (finished). Unless it encounters an error, it is guaranteed to finish. Some literature also defines a codelet as being stateless, i.e. if run twice it could not inherit any information from its first run, but that additional definition is not necessarily adopted here. Codelets are a convenient way to divide the graph 502 which makes the vertices 514 more readily separable amongst different threads, tiles 4 and/or chips 2 when lowered by the compiler 508. In embodiments each vertex 514 may be formed only from codelets. However this is not essential in all embodiments and more generally the vertices 518 may represent any portions of code.

Figure 12:
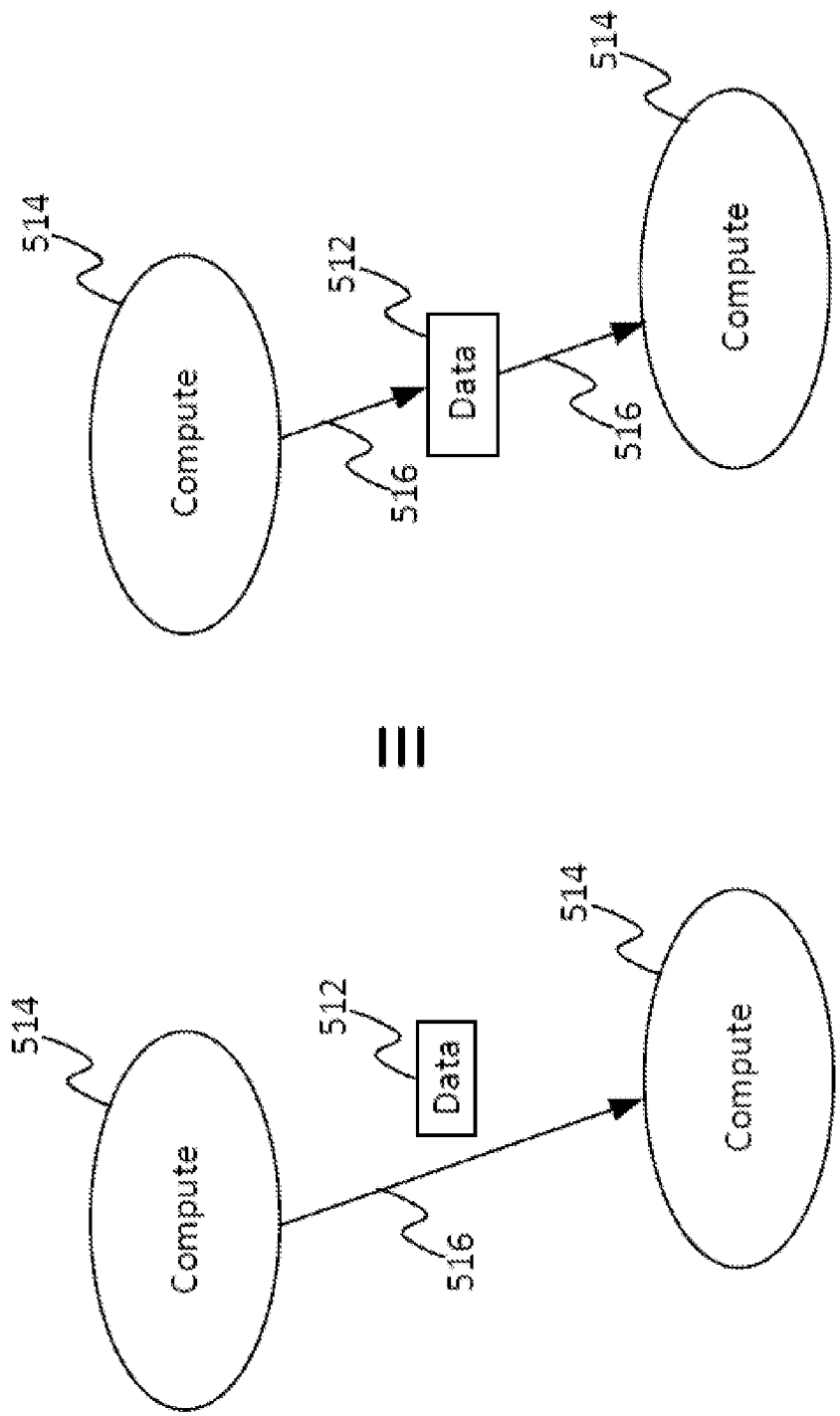

Note also, in some representations the same graph 502 may equivalently be represented by compute nodes (vertices) that are connected to each other with edges and the data elements (variables) are indicated as annotations on the edges, rather than explicitly as data nodes 512. This is shown in the left hand side of FIG. 12. Either representation may equivalently be used. It will be appreciated that annotations of data on edges are a schematically equivalent way of describing data nodes, and the way they are presented to the human developer in any given view in any given tool does not exclude the fact that, in substance, items of data that can be called data nodes are still present in the underlying computational structure of the graph and can still read onto the data nodes 512 disclosed herein. Put another way, a representation of an edge annotated by data is a considered way of representing a data node with an input edge from one compute vertex and an output edge to another vertex (see FIG. 12). The latter representation is adopted herein by way of explanation of the concepts, but it will be appreciated that in substance, a graph as claimed herein refers to the underlying computational graph and not the conceptual or graphical manner in which it is presented to a human. I.e. the graph 502 refers to the underlying data structure comprising functions and flows of data through functions; wherein the functions can be referred to as compute vertices 514 and the data input to or from such functions can be referred to as the data nodes 512, with any logical flow of data into or out of the functions/vertices being referred to as edges.

When the compiler 508 compiles the graph 502, lowering it to run on the execution unit(s) of the processor module(s) 4, then the low-level implementation of the input edges 516 may comprise load operations performed by load type instructions and the low-level implementation of output edges 516 may comprise store operations performed by store type instructions.

In accordance with embodiments of the present disclosure, the compiler 508 comprises an allocator 511 which comprises a constraint solver which is configured to apply one or more constraints when compiling the graph 502.

As part of compilation of a high level graph 502, the compiler 508 lowers the graph, e.g. to individual tiles 4a, 4b, 4c etc on the chip 2. Individual tiles have variables allocated for edges 516 described in the high level graph. Each variable is allocated a contiguous portion of memory space within the memory 22a, which may be one or more contiguous bytes of memory (i.e. a given variable cannot be allocated to non-contiguous portions of memory). Note also that a reference to a variable anywhere does not exclude the option of a constant. The term "data element" could be used to replace the term "variable" anywhere herein. Thus, "data element" or "variable" could include code. There may be different kinds of variables. For example a distinction could be drawn between variables that were present in the high-level graph provided by the user, and variables present in the low-level graph that the compiler operates on.

For example in the input graph created by the user there are no variables containing code. The user specifies what code to run by selecting which codelets to use, however the storage for this code is implicit—there is no possibility to access it in the high-level graph. As part of the compilation process the high-level input graph is transformed into a lower level graph where anything that requires storage may be represented as a variable, including vertex state and vertex code.

Figure 13:
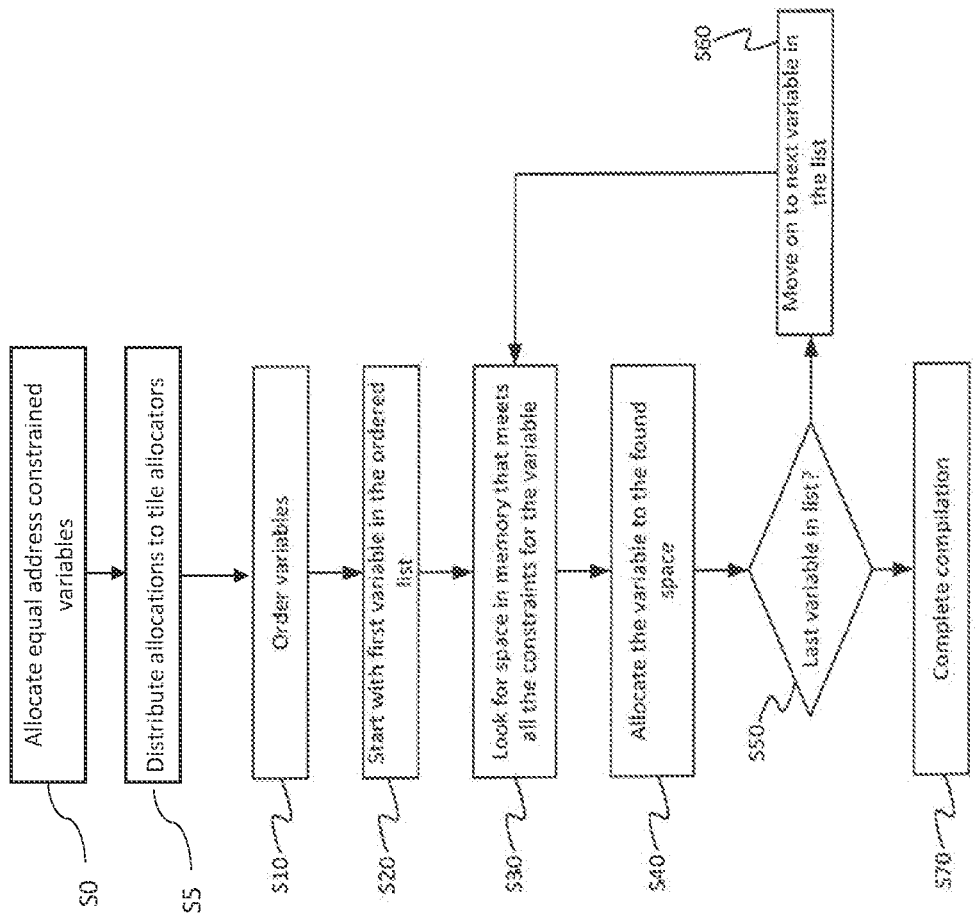
FIG. 13 is a schematic flow chart of a constraint solver process.

FIG. 13 shows a flow chart an example method that may be performed by the constraint solver in the allocator 511 to resolve the constraints for the different variables corresponding to edges 512, and allocate them to respective regions in the memory 22. In short, the method comprises stepping through a list of all the variables in order, and with each variable, allocating it to a part of memory where it will not conflict with any previously allocated variables in the list.

Actual memory addresses are allocated in steps towards the end of the compiling process. In order to allocate the addresses, firstly, constraints are defined. If a determination is made to share a data structure (rather than duplicate across processing units) it can be provided with one or more address constraints. Note that in circumstances where the shared data structure (for example a function call or other jump) contains a pointer to something else, then the variable that it points to also has to be constrained to be at the same address on all tiles where the code is shared.

In order to facilitate greater sharing, equal address constraints are added to the allocator which specify a set of variables across multiple tiles which must be allocated at the same address.

All variables which have equal address constraints are allocated across tiles first in step S0, and unconstrained variables are allocated afterwards per tile.

Equal address constrained variable sets are treated as single variables which have the union of interference of all equivalence classes of all the variables on each tile in that set, and the union of interferences with variables they share element constraints with etc. Equivalence classes are discussed later. Allocation occurs from this point forward in a similar way for all the equal address constrained sets of variables. Once all constrained variables are allocated, these allocations are distributed to individual tile allocators in step S5 and allocation continues per-tile for the remaining unconstrained variables, as described in the following.

At step S10, the method for each tile comprises assigning an order to the unconstrained variables for that tile. Any order can be used. In embodiments, a specific order may be used as an optimization in order to improve the compile time and/or the quality of the allocation (i.e. amount of tile memory required). However, the method will still work regardless of what order is used, it will just be slower than if one of the optimizations is used. E.g. the order could be random instead. Whatever order is selected, step S10 thus results in an ordered list of the variables awaiting allocation.

At step S20 the method comprises selecting the first unconstrained variable in the list to begin the allocation for. At step S30 the method comprises finding a space in memory 22a for the current variable under consideration, which at this point (the first iteration) is the first variable in the list. Note that the constrained variables have already been assigned to memory locations at this point. Any equal address constrained variable allocations need to be taken into account when choosing a region of memory for the first variable. The first variable may have other non-relational constraints, e.g. selecting an address range in the specified type of memory. At step S40 the method comprises allocating the current variable under consideration to the selected region in the memory 22.

At step S50 the method comprises determining whether the variable allocated at step S40 was the last in the list. If not, the method looks back to step S30, to look for a region of memory 22a for allocating the next variable in the order list. This now needs to take into account not only any non-relational constraints, but also any relational constraints. For example, a relational constraint may be that the data of wo variables cannot be loaded from or stored to the same memory bank 23 at the same time. In embodiments, this may be implemented as a constraint that variables cannot be allocated to the same bank if their data will be "live" for at least some of the same time, i.e. for overlapping time periods. Where it is said herein that a variable will be "live", this refers to the time, during runtime, between the data of the variable being written to memory 22a and it being read by the program. To assess whether this constraint is met, the constraint solver 511 may perform a "liveness" analysis, to determine which variables will be live for what times after the program is compiled and run, and which variables will be live at overlapping times. If two variables would be live at overlapping times then they may be said to conflict or interfere with one another (in the sense that, if the compiler 508 tried to allocate them to the same memory bank 23, then the access logic of the memory bank 23 could not service them both at the same time).

Hence at step S30, for each but the first variable in the ordered list, the method comprises finding a region of memory 22a for the variable that does not conflict (interfere) with any other variable allocated so far (any other preceding variable in the ordered list). I.e. it finds an address range in a memory bank 23 not shared with any other variables allocated so far that would be live for at least some of the same time. Put another way, the current variable in the list is allocated to a remaining address space in the memory 22a (as yet unallocated) that does not fall within the same bank 23 any other conflicted, already-allocated variable. At step S40, the method comprises allocating the current variable in the list to the selected region in the memory 22a.

If at step S50 it is determined that the last variable in the list has been allocated, the method proceeds to step S70 where it completes the compilation for that tile. When all tiles have been completed, an executable program may be generated in which the allocated memory address spaces are used to store the data of each variable respectively, and from which that data will be loaded when needed during runtime (and potentially stored back to if required). The compilation may of course involve other conventional compilation steps that will be familiar to a person skilled in the art.

As mentioned, in embodiments the ordered list determined in step S10 may simply be in any order. However, in preferred embodiments, a specific order is selected to try to optimize the speed of the constraint solving process. This optimization may comprise any one, more or all of a number of techniques.

In embodiments, step S10 may comprise ordering the variables according to a certain metric or metrics. For instance, one way to order the variables is by size (i.e. amount of space occupied in memory), with larger size variables at the top of the list and smaller size variables lower down. This means larger variables get allocated first, and smaller ones later. This tends to be faster and improve packing, because there is more opportunity to slot in smaller variables around large ones, than if the allocation was done the other way round. For analogous reasons, another way to order the variables is by amount of time they will be live, with the longer lived variables being placed at the top of the list and therefore being allocated first, and the less long-lived variables being further down the list and allocated after the longer lived variables. Another example metric for ordering the variables is by the size of the program line range for which they will be live, again for similar reasons (starting by allocating longest lived variables first, then slotting in shorter lived variables around them).

In embodiments, a combination of two or more of these metrics and/or other metrics could be used to order the variables; e.g. first ordering by size and then ordering any variables of the same size by liveness time, or vice versa.

Alternatively or additionally to the above, the ordering at step S10 may comprise grouping the variables into "equivalence classes". Each equivalence class is a set of variables which each interfere with some or all of the same other variables. E.g. if variables A and B both interfere with variables D, C and E, then A and B may be placed in one equivalence class whilst D, C and E may be placed in another equivalence class (N.B. just because A and B overlap in time with C, does not necessarily mean A and B overlap with one another). In a structured program there tends to be groups of variables that interfere with the same other variables. In embodiments, the ordering may comprise ordering the equivalence classes according to a metric such as the number of variables in the class (largest classes first), total size of the class in bytes (largest classes first), total live time spanned by the class (longest lived classes first), etc. The advantage of grouping into equivalence classes is that it reduces the processing time of the constraint solver process, because it means the constraint solver in the allocator 511 does not have to re-compute the interference information each time it allocates each individual variable within the class.

In embodiments the variables may also be ordered within the equivalence classes, e.g. again according to a metric such as variable size or liveness time. Thus the variables may be ordered first by class, then by one or more metrics within each class.

In embodiments, a variable constraint builder in the constraint solver builds pair-wise constraints with the types of relational constraint imposed. Non-relational constraint information is also extracted from the high level constraint description by the constraint builder.

Liveness analysis of the graph groups variables which are affected similarly into equivalence classes. This reduces the burden of keeping liveness information for each variable separately. Liveness analyses also build a table of which equivalence classes can and cannot interfere with each other (i.e. which variables are live and not live at the same time). This information along with the constraints information of variables is used by the memory allocator.

In embodiments, the following steps are followed by a memory allocator function in the constraint solver 511 for each tile:
  i. receive equal address constrained allocations for equal address constrained variables.
  ii. order the equivalence classes according to some metric. Common metrics used are the size of the total variables in an equivalence class, or the number of classes it interferes with.
  iii. order variables within each equivalence class according to some metric. Common metrics used are size and alignment.
  iv. ordering of variable allocation is done as per the ordering of equivalence classes determined by step i and step ii.
  v. for each variable v in an ordered equivalence class, find space in memory such that all constraints on the variable are met, and v doesn't clash with any variables already allocated for equivalence classes interfering with the class to which v belongs. The constraints on the variable include all the relational and non-relational constraints. For relational constraints this means if v has a relational constraint with v1, and v1 is already allocated, the relational constraint must be met along with non-relational constraint. If no variable with which v shares a relational constraint is allocated, then only non-relational constraints are met.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A method of storing code on a computer comprising multiple processing units, each processing unit having a local memory configured to store read only elements including executable code sequences and an execution stage for executing at least some of the executable code sequences stored in the local memory, the method comprising:
  identifying at least one of the multiple processing units of the computer as a master processing unit;
  compiling read only elements including executable code sequences for loading into the processing units of the computer, the compiling including allocating at least one shareable read only element to the master processing unit;
  storing in the local memory of the master processing unit the at least one shareable read only element, which is designated to be used by an execution stage of at least one other of the processing units, and a transmitting exchange code sequence designated to be executed at the execution stage of the master processing unit at a time point determined at compile time, the transmitting exchange code sequence causing the processing unit to identify the shareable read only element and to generate a message to be transmitted for reception by the at least one other processing unit, the message comprising the shareable read only element.

2. The method of claim 1 wherein the shareable read only element comprises an executable code sequence to be executed at the execution stage of the at least one other processing unit.

3. The method of claim 2 wherein the executable code sequence comprises an instance of a vertex in an application graph.

4. The method of claim 2 wherein the executable code sequence comprises control code for managing execution of code sequences in the processing units of the computer.

5. The method of claim 1 wherein the shareable read only element comprises a constant value.

6. The method of claim 5 wherein the constant value is one of:
vertex state,
vertex descriptor, and
field data.

7. The method of claim 1 wherein the compiling comprises allocating at least one non-shareable read only element to at least one of the multiple processing units.

8. The method of claim 1 wherein the at least one shareable read only element is contained within a shared data structure which comprises multiple shareable read only elements.

9. The method of claim 1 wherein the step of allocating the at least one shareable read only element comprises allocating multiple shareable read only elements to respective addresses in respective ones of the processing units and resolving address constraints of the shareable read only elements.

10. The method of claim 1 comprising:
storing in the local memory of the at least one other processing unit a receiving exchange code sequence designated to be executed at the execution stage of the at least one other processing unit,
the receiving exchange code sequence causing the at least one other processing unit store the shareable read only element received in the message at an allocated address in the local memory of the at least one other processing unit.

11. The method of claim 1 wherein the step of allocating at least one shareable read only element to the master processing unit comprises:
identifying at least one shared data structure comprising multiple shareable read only elements in a program flow to be compiled,
comparing a storage requirement in memory of the shared data structure storage requirement in memory of the transmitting exchange code sequence, and
determining, based on comparing, whether to allocate the read only element as a shareable data structure to the master processing unit or whether to replicate the shared data structure over multiple processing units.

12. The method of claim 11 wherein the program flow represents an application graph.

13. A computer comprising:
a first processing unit having a first local memory configured to store read only elements including executable code sequences, and a first execution stage for executing at least some of the executable code sequences stored in the first local memory
a second processing unit, including a master processing unit, the second processing unit having a second local memory configured to store read only elements including executable code sequences, and a second execution stage for executing at least some of the executable code sequences stored in the second local memory
wherein the second local memory of the is configured to store a shareable read only element which is designated to be used by the first execution stage, and a transmitting exchange code sequence designated to be executed at the second execution stage and which causes the master processing unit to identify the shareable read only element and to generate a message to be transmitted for reception by the first processing unit,
wherein the first processing unit has stored in the first local memory a receiving exchange code sequence which causes the first processing unit to receive the shareable read only element from the message and to store the shareable read only element at an address in the first local memory for a usage period, the first processing unit being configured to delete the shareable read only element from its local memory after the usage period.

14. The computer of claim 13 wherein be message generated by the transmitting exchange code sequence comprises an address at which the shareable read only element is to be stored at the first processing unit.

15. The computer of claim 13 wherein the shareable read only element stored in the second local memory forms part of a shared data structure comprising multiple other shareable read only elements.

16. The computer of claim 15 wherein the shared data structure comprises an executable code sequence.

17. The computer of claim 15 wherein the shared data structure comprises a set of constant values.

18. The computer of claim 13, comprising additional master processing units.

* * * * *